US009471457B2

(12) United States Patent
Banerjee et al.

(10) Patent No.: US 9,471,457 B2
(45) Date of Patent: *Oct. 18, 2016

(54) PREDICTIVE ALERT THRESHOLD DETERMINATION TOOL

(71) Applicant: International Business Machines Corporation, Armonk, NY (US)

(72) Inventors: Joydeep Banerjee, Rancho Palos Verdes, CA (US); Paul A. Wojciak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,842

(22) Filed: Jan. 8, 2016

(65) Prior Publication Data

US 2016/0124830 A1  May 5, 2016

Related U.S. Application Data

(63) Continuation of application No. 13/531,616, filed on Jun. 25, 2012.

(51) Int. Cl.
*G06F 11/34* (2006.01)

(52) U.S. Cl.
CPC ....... *G06F 11/3409* (2013.01); *G06F 11/3447* (2013.01); *G06F 11/3495* (2013.01); *G06F 2201/81* (2013.01)

(58) Field of Classification Search
CPC ........... G06F 11/3447; G06F 11/3452; G06F 11/3409
See application file for complete search history.

(56) References Cited

U.S. PATENT DOCUMENTS

| 7,017,186 | B2 | 3/2006 | Day |
| 7,076,695 | B2 | 7/2006 | McGee et al. |
| 7,165,037 | B2 | 1/2007 | Lazarus et al. |
| 7,299,367 | B2 | 11/2007 | Hamm et al. |
| 7,433,530 | B2 | 10/2008 | Mitchell et al. |
| 7,792,869 | B2 | 9/2010 | Buscema |

(Continued)

FOREIGN PATENT DOCUMENTS

CN  101093456 A  12/2007

OTHER PUBLICATIONS

U.S. Appl. No. 13/531,616.
U.S. Appl. No. 14/990,842.

*Primary Examiner* — Vivek Srivastava
*Assistant Examiner* — Muhammad Raza
(74) *Attorney, Agent, or Firm* — Francis Lammes; Stephen J. Walder, Jr.; David Zwick

(57) ABSTRACT

Mechanisms are provided for determining threshold conditions for performing operations within a performance monitoring tool. Metric data is collected from a computing system environment and clustering analysis is performed on the metric data to generate a plurality of clusters. One or more candidate clusters are selected that are candidate clusters for generating a threshold condition for performance monitoring. At least one threshold condition for performance monitoring is generated based on a composition of the selected one or more candidate clusters. The at least one threshold condition is then applied to future performance metric data to determine whether to perform an operation in response to the future performance metric data meeting or not meeting the at least one threshold condition.

21 Claims, 6 Drawing Sheets

(56) References Cited

U.S. PATENT DOCUMENTS

| | | | | |
|---|---|---|---|---|
| 2003/0079160 A1* | 4/2003 | McGee | ............... | G06F 11/0709 714/39 |
| 2003/0110007 A1* | 6/2003 | McGee | ............... | G06F 11/0709 702/179 |
| 2004/0088406 A1* | 5/2004 | Corley | .................... | H04L 43/16 709/224 |
| 2004/0117153 A1* | 6/2004 | Siegel | ................. | H04L 41/0681 702/183 |
| 2007/0101202 A1* | 5/2007 | Garbow | ................ | G06F 11/008 714/47.2 |
| 2007/0300231 A1* | 12/2007 | Aguilar | ................. | G06F 9/4881 718/104 |
| 2008/0016412 A1* | 1/2008 | White | ................. | G06F 11/3409 714/48 |
| 2008/0229415 A1 | 9/2008 | Kapoor et al. | | |
| 2009/0106756 A1* | 4/2009 | Feng | ................... | G06F 11/3616 718/100 |
| 2011/0238376 A1* | 9/2011 | Dang | ................. | G06F 11/3409 702/186 |
| 2013/0030785 A1* | 1/2013 | Satterfield | ............. | G06Q 10/06 703/21 |
| 2013/0111588 A1* | 5/2013 | Agrawal | ............... | G06F 21/552 726/23 |

* cited by examiner though the two values to the one or more processing this the system is an example and the illustration of the illustration of the illustration of the illustration
PREDICTIVE ALERT THRESHOLD DETERMINATION TOOL

BACKGROUND

The present application relates generally to an improved data processing apparatus and method and more specifically to mechanisms for enabling predictive alert threshold determination via a predictive alert threshold determination tool.

Most complex information technology solutions are comprised of servers, operating systems, middleware, applications, storage, and interconnect devices. Computer system performance monitoring mechanisms collect many different metrics describing the computer system's operation and behavior across all these components. Many different products exist that apply thresholds to these performance monitor metrics for the purport of generating alerts. For example, resource capacity reaching saturation or nearing exhaustion within the computing system environment may be a condition giving rise to an alert being generated.

Most computer system performance monitoring mechanisms use default thresholds for alerting and also provide a mechanism for manually defining alert thresholds. These are typically static values arrived at with little or no insight into the specific information technology solution's characteristics. Often the monitoring tools' default threshold values are not optimized for any given information technology solution. These default threshold values lead to unnecessary alerting for conditions that are not critical and also lead to missed alerts for situations that are critical.

SUMMARY

In one illustrative embodiment, a method, in a data processing system comprising a processor and a memory, is provided for determining threshold conditions for performing operations within a performance monitoring tool. The method comprises collecting, by the data processing system, performance metric data from a computing system environment. The method further comprises performing, by the data processing system, clustering analysis on the performance metric data to generate a plurality of clusters of performance metric data for one or more performance metrics. The method also comprises selecting, by the data processing system, one or more candidate clusters in the plurality of clusters that are candidate clusters for generating a threshold condition for performance monitoring. In addition, the method comprises generating, by the data processing system, at least one threshold condition for performance monitoring based on a composition of the selected one or more candidate clusters. Moreover, the method comprises applying the at least one threshold condition to future performance metric data to determine whether to perform an operation in response to the future performance metric data meeting or not meeting the at least one threshold condition.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
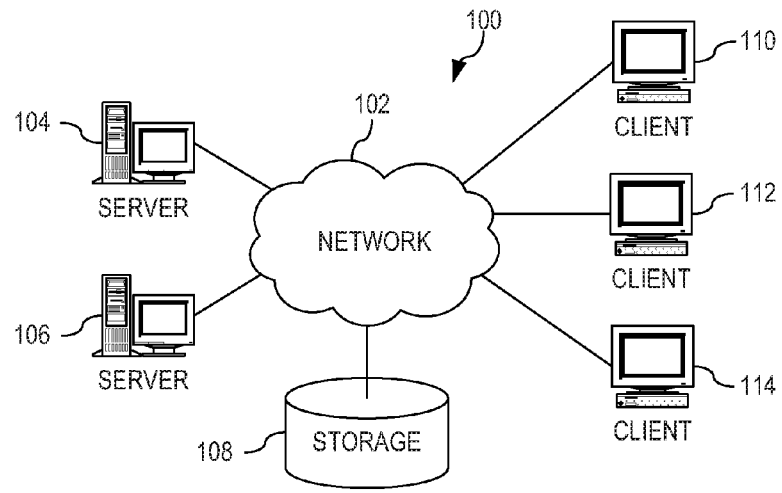
FIG. 1 is an example diagram of a distributed data processing system in which aspects of the illustrative embodiments may be implemented.

The illustrative embodiments provide mechanisms for predictive alert threshold determination. The illustrative embodiments take existing performance metric data, examine their multi-dimensional relationships, and derive appropriate threshold values for a specific information technology solution.

Most modern computer system performance monitoring mechanisms collect metrics from the computing system environments (which includes the computers, storage, networks, etc.) being monitored and compares the metrics, or values generated from these metrics, against one or more static threshold values to determine if alerts should be generated. However, determining the correct performance metric threshold values to use for alerts presents a sizeable challenge. Often one static threshold value is not sufficient nor are thresholds based on a simple three-sigma or 1.5 interquartile range outlier identification approach.

For example, appropriate threshold values for some metrics may need to vary based on time of day, day of the week, etc. Workload spikes may cause some metrics to exceed threshold values for several intervals thereby creating unnecessary alerts when those spikes did not represent a real danger to the computing system environment or did not represent a permanent condition.

The illustrative embodiments address these issues with regard to static threshold values by providing mechanisms for arriving at flexible, adaptive threshold values pertinent to the performance metrics for a given information technology solution. With the illustrative embodiments, threshold values are determined based on the particular workloads and associated performance metrics for the particular information technology (IT) solution. The IT solution may be one or more computer systems with their associated hardware, operating systems, middleware, and application software directed to working together to perform a particular function. Metrics regarding performance, capacity, and resource utilization are captured for all hardware and software components of the IT solution. One example of an IT solution may be, for example, a business service that takes customer orders through the Internet. Within this IT solution there are endpoint computer systems through which customer orders are placed and those orders are cross-reference with the inventory database running on a separate computer system. There may also be intermediate computer systems that run the billing, order fulfillment, and parts reordering aspects of the business service, for example. All of these devices and their software components related to the business service are considered part of the IT solution.

The illustrative embodiments determine the threshold values based on the most important metrics for that (IT) solution. The illustrative embodiments combine historical performance metrics with real time monitoring data so that threshold values can be adapted as the workload changes across the information technology solution. The result is threshold values used for alerting that produce less false positives and far fewer missed critical conditions. Consequently, less time is required by human administrators in managing alerts across their information technology solution.

The illustrative embodiments utilize a methodology that comprises five primary operations. First, existing performance monitor metric data for the particular IT solution is evaluated. Second, an optional dimension reduction operation on the monitored metric data may be performed using feature set reduction or principle component analysis; the intent here being to start determining the important metrics in the given information technology solution. Third, cluster analysis is performed to further identify the most important metrics and to generate clusters of data associated with important cluster states defined as good, bad, undesirable, outliers, etc. Fourth, classification modeling is performed to create rules that describe each of the cluster states. Fifth, rules of one or more of the cluster states are selected to create alerts in the computing system performance monitoring mechanism. Each of these operations will be described in greater detail hereafter.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
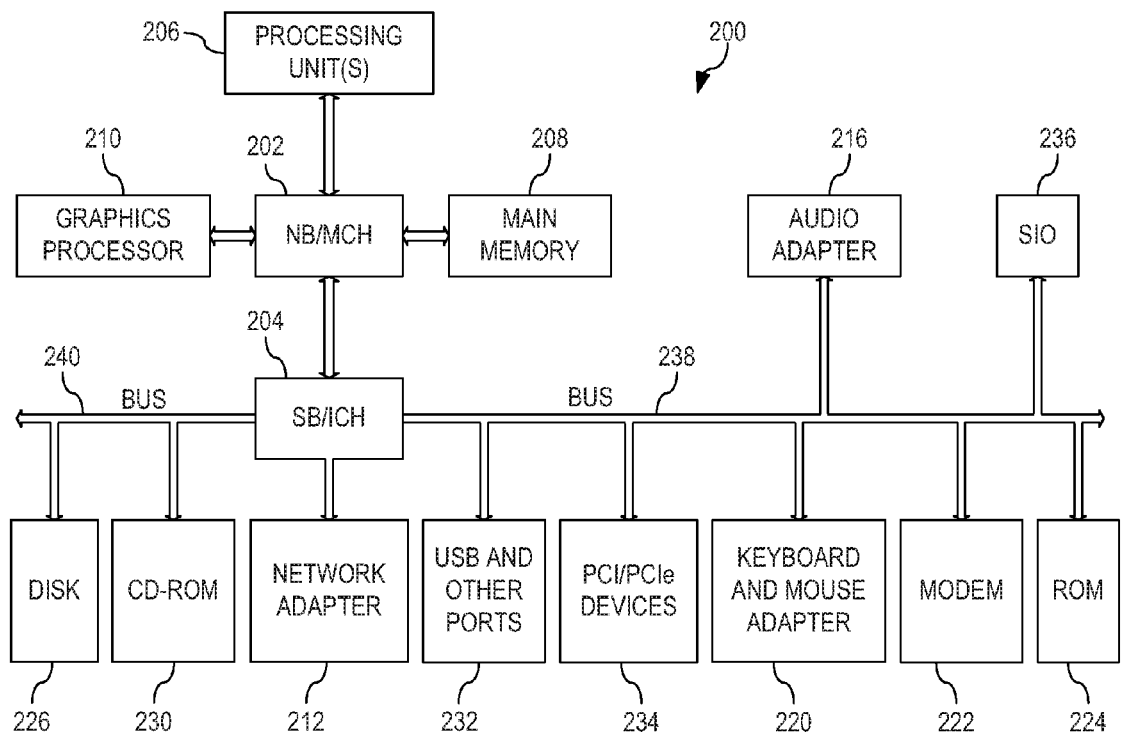
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the servers 104, 106 may comprise a performance monitor tool for monitoring the performance of computing resources of a computing system environment. The computing system environment may involve one or more other servers, e.g., server 106 if the performance monitor tool is present on server 104, one or more client computing devices, e.g., clients 110-114, storage systems, such as storage unit 108, networks, such as network 102, and the like. Moreover, such monitored computing system environments may involve many other computing systems, computing system resources (e.g., memories, bandwidth, etc.), for which performance monitoring is performed.

The performance monitor tool, in accordance with the illustrative embodiments, employs a dynamic threshold calculation engine for dynamically determining an appropriate set of one or more threshold values to be utilized with alert generation operations. The dynamic threshold calculation engine operates on historical metric information maintained in a storage system associated with the performance monitor tool, and currently obtained metric data, for a computing resource, computing environment, workload, or the like, that is being monitored. For example, if server response time is being monitored within a first computing environment, then the historical and current metrics for server response time may be analyzed as inputs to the dynamic threshold calculation engine.

In order to better understand the improvements to performance monitoring tools that the mechanisms of the illustrative embodiments provide, it is first helpful to consider a performance monitoring tool that may be enhanced using the mechanisms of the illustrative embodiments. Thus, a discussion of a performance monitoring tool that is enhanced by the mechanisms of the illustrative embodiments, and thus is integral with and is itself included as an embodiment of the present invention, is hereafter provided. The performance monitoring tool described hereafter with regard to FIGS. 3-6 is similar to that described in commonly owned U.S. Pat. No. 7,299,367. However, it should be noted that the mechanisms of the illustrative embodiments improve upon the performance monitoring tool described in this commonly owned U.S. Patent Application by providing mechanisms for dynamically and adaptively predicting appropriate alert thresholds, as discussed hereafter.

Pursuant to certain embodiments of the present invention, machine learning/data mining methodologies may be used to search an archive of historical data to generate, and/or assess the sensitivity of candidate resource monitoring systems. These candidate resource monitoring systems may be derived using information regarding situations where a specific corrective action was previously found to be an acceptable solution to a problem that had arisen with the system that is to be monitored. The methodologies of the present invention may be incorporated into a "design wizard" that may be used to simplify the process for creating a resource monitoring system.

In the illustrative embodiments, a plurality of raw metrics $m_i$ may be selected that are used in the development of the resource monitoring system. By "raw metrics" what is meant is numerical or other parameters associated with the resource that is being monitored such as, for example, the cumulative number of page faults, the number of page faults per unit time, response times for various actions, bandwidth utilization, memory utilization, number of retransmissions of packets, numbers of dropped packets, and the like. The value of these raw metrics typically vary over time. Thus, each raw metric $m_i$ may be represented by a vector $m_i(t)$, where each entry in the vector represents the measured value of $m_i$ at a specific time. The index for each metric typically will be persistent, such that if $mi(t)$ refers to a given metric at time t, $m_i(t')$ refers to the same metric at time t', and $(m_i(t')-m_i(t))$ gives a semantically meaningful difference. As discussed herein, a historical database of values for the selected raw metrics $m_i(t)$ is used in the construction of the resource monitoring system, so typically the selected raw metrics will be metrics for which historical data is available and/or can be generated.

A predicate G may also be defined that is a function of certain metrics (either the raw metrics discussed above and/or the "derived metrics" discussed below) that are associated with the system that is to be monitored. The predicate G may have an unknown structure and may be taken as a description of the gross characteristics of the situation that the resource monitoring system is intended to detect. A predicate is a function of the identified variables that returns a truth value (e.g., TRUE or FALSE) based on the values of the identified variables. In embodiments of the present invention, the predicate may be allowed to operate in a three-valued logic domain of TRUE, FALSE and NO COMMITMENT (the value of NO COMMITMENT means that the predicate makes no commitment as to whether G is true or false in a specific situation). In some illustrative embodiments, the predicate G may be a function of one or more of the selected metrics taken at adjacent measurement times t and t'. In further embodiments of the invention, G may be a function of one or more of the selected metrics taken over a range of times or on a time-limited average.

As discussed herein, a user of the methods, systems and/or computer program products of the present invention may provide an initial theory regarding G. This initial theory acts to initialize the methodology and the methodology/system may be run iteratively until the user is satisfied with the result or the methodology/system demonstrates that no system is consistent with the user's proposed theories. By way of example, with respect to network server resources, many conditions can cause response times of the server to rise above a threshold. For example, in the specific situation where (1) servlet response times are above a specified threshold, (2) a "large" number of sessions have been open for an "extended" time and (3) the associated Java Virtual Machine is using "minimal" CPU resources, it may be indicative of a deadlock. The appropriate response in such a situation of a deadlock is to shutdown and restart the application server. The user would like to construct a resource monitoring system that identifies this situation with a minimum number of false positives (i.e., situations where the resource monitoring system identifies a deadlock as having occurred when it in fact has not occurred) and false negatives (i.e., situations where the resource monitoring system fails to identify that a deadlock has occurred). The user, who initially may only know that in the past when the response time was too high and that a restart fixed the problem may seed the methodology for constructing a resource monitoring system that will take the corrective action of restarting the system with the following initial theory of G:

$$G(m_i(t)) \text{ is TRUE if } m_i(t) > x \quad (1)$$

where $m_i(t)$ is the servlet response time and x is a value such as, for example, 180 seconds, that is supplied by the user. As discussed herein, this initial theory of G may be used to classify specific observations from a historical database of data into positive (i.e., TRUE), negative (i.e., FALSE) and indeterminate (i.e., NO COMMITMENT) examples.

In some illustrative embodiments, the following logical atoms may be defined:

$$\text{METRIC} \leq \text{THRESHOLD; or} \quad (2)$$

$$\text{METRIC} \geq \text{THRESHOLD,} \quad (3)$$

where METRIC is a metric that is used in the resource monitoring system and THRESHOLD is an unknown threshold value. One or more of the raw metrics $m_i(t)$ may be used for METRIC. Alternatively, one or more derived metrics $D_k(m_i)$ may be used for METRIC, where a "derived metric" refers to a metric that is calculated based on the values of one or more of the raw metrics. The notation $D_k(m_i)$ is used herein to represent the $k^{th}$ derived metric that is based on raw metric $m_i(t)$. Also note that derived metric $D_k(m_i)$ may be a vector having values for different points in time, although to simplify the notation, the term $m_i(t)$ has been shortened to $m_i$. The use of derived metrics may, in certain situations, provide more and/or better information regarding when a particular resource that is being monitored has reached a point that some sort of corrective action may be beneficial. In some illustrative embodiments of the present invention, one or more of the following derived metrics may be used in the construction of resource monitoring systems:

$$D_1(m_i) = m_i(t); \quad (4)$$

$$D_2(m_i) = m_i(t) - m_i(t'); \quad (5)$$

$$D_3(m_i) = [m_i(t) - m_i(t')]/dt; \text{ or} \quad (6)$$

$$D_4(m_i) = [m_i(t) - m_i(t')]/[m_j(t) - m_j(t')], \quad (7)$$

where t and t' are adjacent times in the database of raw metric values and division by zero is not implied. Note also that the "derived metric" $D_1(m_i)$ is not a derived metric at all, but instead is simply the raw metric $m_i(t)$. Note further that the derived metric $D_4(m_i)$ may be calculated for as many different combinations of first raw metrics $m_i(t)$ and second raw metrics $m_j(t)$ as is desired. It will also be appreciated that the invention is not limited to using some, any, or all of the exemplary derived metrics set forth above. For example, as discussed above, derived metrics at time t can include functions of many metrics taken over a range of times.

As noted above, a historical database of values for the raw metrics $m_i(t)$ is available or generated for use in the methods, systems and computer program products of the illustrative embodiments. By "database" what is meant is a collection of data stored in any form, including data stored, for example, in a table or a file on a data processing system. Thus, the term "database" is used broadly herein and is not limited to data that is stored in or used with, for example, a conventional database program such as a relational database. In some illustrative embodiments in which derived metrics are used, a database of derived metric values may be constructed using the historical database of values for the raw metrics $m_i(t)$ and the equations that define each of the derived metrics, such as those described above.

A logic value may be associated with at least some of the entries in the database of metric values (this may be either the historical database of raw metric values of the database of derived metric values depending upon which type of metric is used in any particular implementation). In some illustrative embodiments, a three valued logic system may be used where the logic values may be TRUE, FALSE or NO COMMITMENT. A logic value of NO COMMITMENT may be the default when no logic value is associated with entries in the database of metric values. Typically, the same logic value will be associated with all of the derived metrics associated with a particular time $t_1$. However, this need not be the case.

Continuing with the example set forth above, the user seeds the methodology by initially proposing the theory that $G(m_1(t))$ is TRUE if $m_1(t) > x$ where $x=180$ and $m_1(t)$ is the raw metric for servlet response time. Based on this initial theory, entries in the historical database having a servlet response time that exceeds 180 are classified as TRUE (i.e., the logical value TRUE is associated with those entries in the database). The user may choose to classify additional entries in the database as FALSE, and may make no commitment with respect to other entries. In many instances, logic values of TRUE or FALSE will only be associated with a relatively small percentage of the entries in the database.

A "situational description" algorithm may be executed to determine feasible threshold settings, if any, for which the logical atoms METRIC≤THRESHOLD and METRIC≥THRESHOLD hold true. An interval [a, b] may be defined that represents the lower and upper endpoints, respectively, of the set of feasible threshold values for which a particular metric (e.g., $m_1(t)$ or $D_2(m_3)$) is less than or equal to the threshold. Likewise, a second interval [c, d] may be defined that represents the lower and upper endpoints, respectively, of the set of feasible threshold values for which the metric at issue is greater than or equal to the threshold.

The "situational description" algorithm starts with the lower endpoints "a" and "c" of the two feasible ranges of threshold settings initialized to the lowest possible value that they can attain (e.g., negative infinity, 0, etc., depending upon what the metric is and the lowest value that it can attain) and with the upper endpoints "b" and "d" of the two feasible ranges of threshold settings initialized to the highest possible value that they can attain (e.g., infinity, $2^{31-1}$, etc.). The "situational description" algorithm then uses the information from the historical database (i.e., the database of raw metrics or the database of derived metrics depending upon the type of metric at issue) to move the endpoints of each range [a, b] and [c, d] closer together by using the information provided by the user about G to classify additional data in the database into positive (TRUE) or negative (FALSE) examples. In certain embodiments of the present invention this may be accomplished as described below.

After initializing the endpoints of the ranges as discussed above, the relevant database of historical information is examined to identify each entry for the metric at issue that has been associated with a logical value of TRUE or a logical value of FALSE (entries with a logical value of NO COMMITMENT may be ignored). Where a logical value of TRUE has been associated with a particular entry for one of the metrics in the database, endpoint "a" of the first range is recalculated as the greater of "a" or the value of the particular entry for the metric ("theta") in the database. In this situation endpoint "b" retains its previous value. Where a logical value of FALSE has been associated with a particular entry for the metric in the database, endpoint "a" retains its previous value and endpoint "b" is recalculated as the lesser of "b" and theta. Likewise, where a logical value of TRUE has been associated with a particular entry the metric in the database, endpoint "c" retains its previous value and endpoint "d" is recalculated as the lesser of "d" and theta. Where a logical value of FALSE has been associated with a particular entry for the metric in the database, endpoint "c" is recalculated as the greater of "c" and theta and endpoint "d" retains its previous value. The output of this algorithm is a table of five-tuples <METRIC, a, b, c, d>, where one such five-tuple exists for each metric (e.g., $D_k(m_i)$) that is processed using the situational description algorithm. Table 1 summarizes the processing steps that comprise the situational description algorithm:

TABLE 1

| Disjunct | Positive (TRUE) Example | Negative (FALSE) Example |
| --- | --- | --- |
| METRIC ≤ THRESHOLD | [a, b] = [max(a, theta), b] | [a, b] = [a, min(b, theta)] |
| METRIC ≥ THRESHOLD | [c, d] = [c, min(d, theta)] | [c, d] = [max(c, theta), d] |

In some illustrative embodiments, the list of five-tuples <METRIC, a, b, c, d> that are generated via the processing steps of Table 1 may be used to construct an instantaneous resource monitoring system. The condition that gives rise to an alert condition is called "COND." COND may be initialized to a value of "TRUE." The equation for COND may then be further constructed using the five-tuples <METRIC, a, b, c, d> as follows. For each five-tuple<METRIC, a, b, c, d>:

$$\text{if } (a > b) \text{ and } (c > d), \text{ COND remains unchanged;} \quad (8)$$

$$\text{if } (a < b) \text{ and } (c < d), \text{ "METRIC} \leq a \text{ and METRIC} \geq c \text{" is appended to COND;} \quad (9)$$

$$\text{if } (a < b) \text{ and } (c > d), \text{ "METRIC} \leq a \text{" is appended to COND; and} \quad (10)$$

$$\text{if } (a > b) \text{ and } (c < d), \text{ "METRIC} \geq c \text{" is appended to COND.} \quad (11)$$

The processing of each of the five-tuples <METRIC, a, b, c, d> provides the mathematical expression of the complete function that comprises a candidate instantaneous resource monitoring system. This candidate instantaneous resource monitoring system may then be evaluated and refined, used to develop a candidate persistent resource monitoring system and/or used to monitor the resource that is to be monitored.

Figure 3:
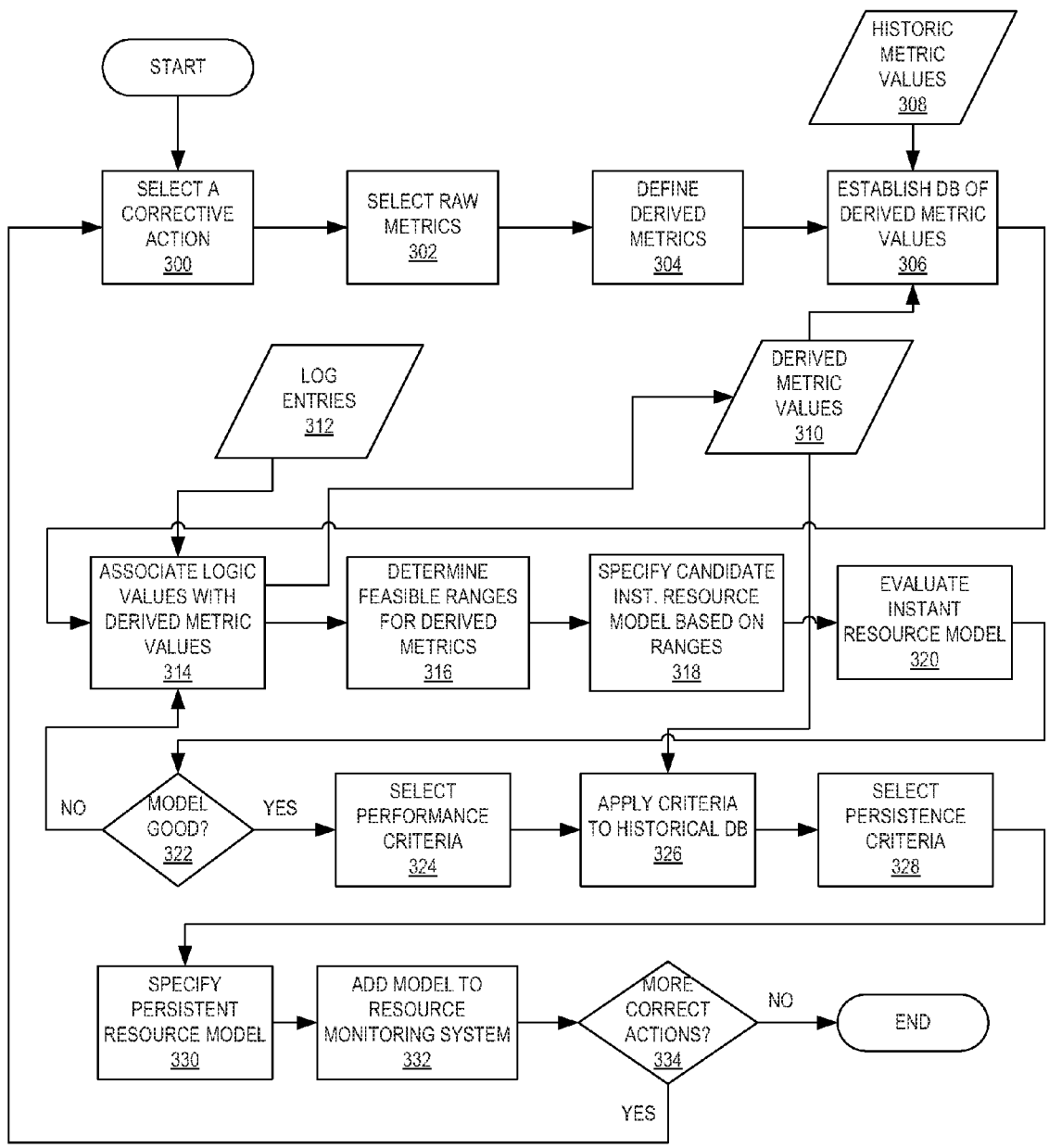
FIG. 3 is a flowchart diagram that illustrates operations according to embodiments of the present invention that may be used to develop resource monitoring systems.

FIG. 3 is a flowchart diagram that illustrates operations according to embodiments of the present invention that may be used to develop resource monitoring systems. As shown in FIG. 3, the operations may start with the selection of a particular corrective action that the resource monitoring system is to perform (block 300). By way of example, corrective actions that could be specified might include alerting an operator, notifying a user of the resource, shutting down the resource (and perhaps thereafter restarting it) and/or shutting down related systems, applications and/or resources, or the like. The particular type of corrective action may be defined by, for example, the designer of the resource monitoring system. As shown in FIG. 3, resource monitoring systems generated according to certain illustrative embodiments of the present invention may be designed to implement more than one corrective action where the corrective action taken will vary depending upon the values of various system parameters (i.e., metrics) that are monitored by the resource monitoring system.

Next, a plurality of raw metrics $m_i(t)$ may be selected that are used by the resource monitoring system (block 302). As discussed above, illustrative embodiments may use raw metrics and/or derived metrics in the construction of the resource monitoring system (a "derived metric" is a metric that is calculated based on the values of one or more of the raw metrics). For example, in some of the illustrative embodiments, such as illustrated in FIG. 3, a plurality of derived metrics are used. As shown in FIG. 3, after selection of the raw metrics $m_i(t)$ operations continue at block 304 with the definition of the derived metrics $D_k(m_i)$ that are to be used in the construction of the resource monitoring system. In some illustrative embodiments, a system or computer program product that is used in the construction of the resource monitoring systems may define the derived metrics that are to be used (either by using pre-assigned derived networks or by adaptively selecting the derived metrics that are to be used based on information regarding the system that is to be monitored) or, alternatively the derived metrics that are used may be defined by the user/operator of the system. Examples of the types of derived metrics that might be used in the methods, systems and computer program products of the present invention have been previously discussed above.

Typically, a historical database of values for the raw metrics (database 308) will already be in existence with respect to the resource that is to be monitored, although such a database may also be specially constructed for use in the methods, systems and computer program products of the present invention. In illustrative embodiments of the present invention where derived metrics are used, at block 306 of FIG. 3, a database of derived metric values (database 310) may be established. This may be accomplished, for example, by taking data from the historical database of values for the raw metrics $m_i(t)$ (database 308) and using that data in the equations that define the selected derived metrics $D_k(m_i)$ to compute historical values for the derived metrics. It will be appreciated, however, that a historical database of values for the derived metrics need not be compiled, as the values of the derived metrics may be computed directly from the raw metric data on an as needed basis. That is, both historical metric data and current raw metric data may be used without departing from the spirit and scope of the illustrative embodiments.

As shown at block 314 of FIG. 3, a logic value may be associated with at least some of the entries in the database of derived metric values (database 310). In illustrative embodiments, the logic values that are associated with entries in the database of derived metric values (database 310) may be provided by the user of the methods, systems and computer program products of the illustrative embodiments. Such a user might, for example, look at log entries (each of which may have a time stamp) made during previous operation of the resource that is to be monitored to identify error codes or other information that may be useful in developing a resource monitoring system. These log entries may be contained in a log file 312 or may be obtained from a variety of other sources. By way of example, the user might specify as TRUE all of the values in the derived metric database that are within 2 minutes of a time at which a log entry of "Error Code=237" was recorded in the log file 312. The user might also specify that all of the derived metrics at the time of a log entry of "Code Restart" are FALSE. More sophisticated criteria may be used for associating logical values with entries in the database 310 of derived metric values such as, for example, associating values based on the manner in which two different log entries interact. Derived metrics which are not associated with a logic value of TRUE or FALSE may be assigned a logic value of NO COMMITMENT, for example. It will also be appreciated by persons of skill in the art that the association of logic values with entries in the historical databases may be automated in some illustrative embodiments of the present invention, as will be described in greater detail hereafter.

Operations continue in the flowchart of FIG. 3 at block 316 with the determination of feasible ranges of values for a threshold such that the threshold will have a specified relationship with respect to one of the derived metrics. In particular, in the embodiments of the invention illustrated in FIG. 3, for each derived metric $D_k(m_i)$ the operations of block 316 determine an interval [a, b] that represents the feasible range, if any, for a threshold such that the logical atom $D_k(m_i) \leq$ THRESHOLD will be TRUE. The operations at block 316 likewise determine for each derived metric $D_k(m_i)$ an interval [c, d] that represents the feasible range, if any, for a threshold such that the logical atom $D_k(m_i) \geq$ THRESHOLD will be TRUE. It will be appreciated that the system may be designed to operate with other logical atoms. As discussed above, the situational description algorithm set forth in Table 1 may be used to determine the intervals [a, b] and [c, d].

Although not depicted in FIG. 3, after the feasible ranges are determined for each of the derived metrics $D_k(m_i)$, the user may choose to evaluate the output of the situational description algorithm and, if necessary, modify some of the input information such as the logic values associated with specific entries in the historical database 310 of derived metric values and/or the derived metrics that are used. Such an evaluation step may facilitate efficient construction of the resource monitoring system, particularly in situations where the situational description algorithm indicates that with respect to a particular derived metric $D_k(m_i)$ that (a>b) and that (c>d), indicating that for metric $D_k(m_i)$ there are no feasible threshold ranges that will render either of the logical atoms TRUE. Additionally, even in situations where feasible ranges are identified, it may be helpful to the design process to apply the identified range to the historical database to determine how many additional NO COMMITMENT entries in the database the identified range will move to a TRUE or FALSE setting.

Next, at block 318 of FIG. 3, a candidate instantaneous resource monitoring system may be constructed based on the identified feasible ranges for threshold values (i.e., the five-tuples <$D_k(m_i)$, a, b, c, d>). This may be accomplished by performing the instantaneous resource monitoring system construction operations specified above to arrive at the condition COND that will be used to identify when an alert condition has arisen. A designer may then (optionally) choose to evaluate the candidate resource monitoring system (block 320). In some illustrative embodiments, this evaluation may be accomplished by using data from the historical database 308 of raw metric values and/or the database 310 of derived metric values to identify the situations where the candidate resource monitoring system would have generated an alert condition. The designer may then compare this information to a log file or other information regarding the operation of the resource at the time the values in the historical database 308 were generated to determine how effective the candidate resource model was in correctly identifying situations in which alerts should have been raised. This may be done, for example, by evaluating the number of false positives (situations where an alert would have been raised even though there was no actual problem) or the number of false negatives (situations when an alert should have been raised but would not have been raised by the candidate resource monitoring system) that would have occurred had the candidate resource monitoring system been in use. (Note that the specific instantaneous resource model described above will only generate false positives because the condition COND that represents the instantaneous resource monitoring system was initialized as TRUE—however, other implementations that will result in the generation of false negatives are also within the scope of the illustrative embodiments of the present invention.)

If, at block 322 of FIG. 3, the candidate resource monitoring system is not deemed acceptable, operations may continue by revising some of the information used to generate the model. As shown in FIG. 3, one such revision may be to change some of the logic values that are associated with the data in the database 310 of derived metric values (block 314). This may be done, for example, by making TRUE or FALSE commitments on more or less entries in the database. Additional potential revisions (not illustrated in FIG. 3) would be to modify the selection of raw metrics and/or the selection of derived metrics that were used to construct the candidate resource monitoring system and/or to modify the corrective action that is taken by the resource monitoring system.

If, at block 322, the candidate model is deemed acceptable, a resource monitoring system is provided. This model may be used to monitor a system and/or to develop further resource monitoring systems. One way to develop a more sophisticated resource monitoring system is to expand the system to include more corrective actions. This may be accomplished, for example, by selecting one or more additional corrective actions at block 300 and then using the methodology illustrated in FIG. 3 and described herein to generate the conditions COND under which the resource monitoring system will implement these additional corrective actions.

Additional operations for creating a resource monitoring system according to further embodiments of the present invention are illustrated in blocks 324, 326, 328, 330, 332, 334 of FIG. 3. The operations set forth in these blocks of FIG. 3 may be used to take the instantaneous resource monitoring system generated at block 322 and use it to generate a persistent resource monitoring system.

As shown in FIG. 3, generation of the persistent resource model starts at block 324 with the provision of several input criteria, namely (1) the required "responsiveness" for the model, (2) a maximum acceptable level of false positive alerts generated by the resource monitoring system and (3) a maximum acceptable level of false negative alerts generated by the resource monitoring system. The "responsiveness" refers to the maximum amount of time that may elapse before the resource monitoring system implements the specified corrective action. Thus, the responsiveness criteria acts to limit the amount of "history" that the resource monitoring system may evaluate in determining whether or not to raise an alert in a particular situation. For example, if the responsiveness is specified as 10 minutes and the sampling interval (i.e., the time interval at which measurements of the raw metrics are taken) is 30 seconds, the maximum amount of history that may be considered is 600/30+1=21 time intervals worth of raw metric data. As will be appreciated by those of skill in the art, typically increasing the amount of history considered by the persistent resource monitoring system increases the systems capability to accurately identify alert situations. However, increasing the amount of history considered also decreases the responsiveness of the system as an alert (typically) is not issued until the specified amount of history has been considered.

Next, as illustrated at block 326 of FIG. 3, the condition COND generated at block 320 of FIG. 3 may be applied to the database 310 of derived metric values. At each time entry (sample) in the database 310, the condition COND either will or will not be met. If the condition COND is met, this represents an "occurrence", meaning that it is a situation where the instantaneous resource monitoring system generated at block 320 would recognize as an "alert condition" and take corrective action. A field may be added to the database 310 recording whether or not the condition COND is met for each time entry in the database. This information may then be used to generate a table that lists the number of alerts that would be generated at all feasible combinations of occurrences (and acceptable number of holes) and holes for the specified responsiveness criteria. An exemplary technique for selecting the occurrences and holes settings operates by constructing a table of the following form:

TABLE 2

Analysis of Model at Persistence Criteria Requiring 3 Interval Persistence

| Setting (occ, holes) | Alert Cond. | False Pos. | Max False Neg. 0 | Max False Neg. 1 | Max False Neg. 2 | Max False Neg. 3 | Max False Neg. 4 | Max False Neg. 5 |
|---|---|---|---|---|---|---|---|---|
| (1, 0) | 3 | 2 | 0 | 0 | 0 | 0 | 0 | 0 |
| (3, 0) | 1 | 0 | 2 | 2 | 3 | 3 | 3 | 3 |

The entries in Table 2 are shown against an example history comprised of the raw occurrences:

++---+--+++------

In this example, a '+' indicates an interval during which COND was met; a '−' indicates an interval where the COND was not met. Analysis of this history with an (occurrences, holes) setting of (1,0) would generate 3 contiguous alert condition intervals; similarly, a setting of (2,0) would generate 2 contiguous alert condition intervals. With a persistence criteria requiring the alert condition to be at least 3 intervals in length, these alert conditions would be false positives (not meeting the persistence criteria) in all but the last contiguous interval. The "Maximum False Negative" columns are filled in by computing the number of raw occurrences that are not "claimed" by a contiguous alert interval taken against a proxy standard, those that would be claimed with a (2,i) interval setting. Each entry of the Maximum False Negatives sub-table corresponds to the count of unclaimed raw occurrences at setting (x,y) taken against the (2,i) standard. For example, the output of a persistence algorithm against the above history would be:

Raw:   +  +  −  −  −  +  −  −  +  +  +  +  −  −  −  −  −  −
(2, 0) +  +  −  −  −  −  −  −  +  +  +  +  −  −  −  −  −  −

-continued

| | | | | | | | | | | | | | | | | | |
|---|---|---|---|---|---|---|---|---|---|---|---|---|---|---|---|---|---|
| (2, 1) | + | + | − | − | − | − | − | − | + | + | + | + | − | − | − | − | − |
| (2, 2) | + | + | − | − | − | + | + | + | + | + | + | + | − | − | − | − | − |
| (3, 0) | − | − | − | − | − | − | − | − | + | + | + | + | − | − | − | − | − |

The (2,2) setting picks up the raw occurrence at the sixth time interval that is missed by the (3,0) setting, indicating that a false negative might exist at position 6 under a (3,0) setting. (The use of the (2,i) standard is motivated by the fact that persistence requires at least two occurrences, a first and a last, separated by some number of occurrences and/or holes. Analysis against this standard gives the maximum number of indications that could have been raised.) Each entry in the Maximum False Negatives sub-table can be computed by counting the number of intervals for which the raw and (2,i) standards both have '+' and the analyzed setting's interval contains '−'. This analysis can be refined by many additional techniques: for example, one could determine the maximum number of justifiable positives at a given responsiveness by processing the output of the persistence algorithm to eliminate the false positives.

Based on the analysis at block 326, a particular persistence criteria may be selected (block 328). The persistent resource monitoring system associated with the corrective action identified at block 300 is then added as part of the overall persistent resource monitoring system (blocks 330 and 332). If additional corrective actions are to be added to the system (block 334), operations may start again at block 300 with the new corrective action. Once no more corrective actions need to be added, the persistent resource monitoring system is completed.

It will be appreciated by those of skill in the art that the operations depicted in FIG. 3 need not necessarily be performed in the order illustrated in FIG. 3, and that all of the illustrated operations need not be performed. As such, FIG. 3 is not intended to limit the illustrative embodiments of the present invention in terms of either the operations that are performed or the order in which such operations are carried out.

Figure 4:
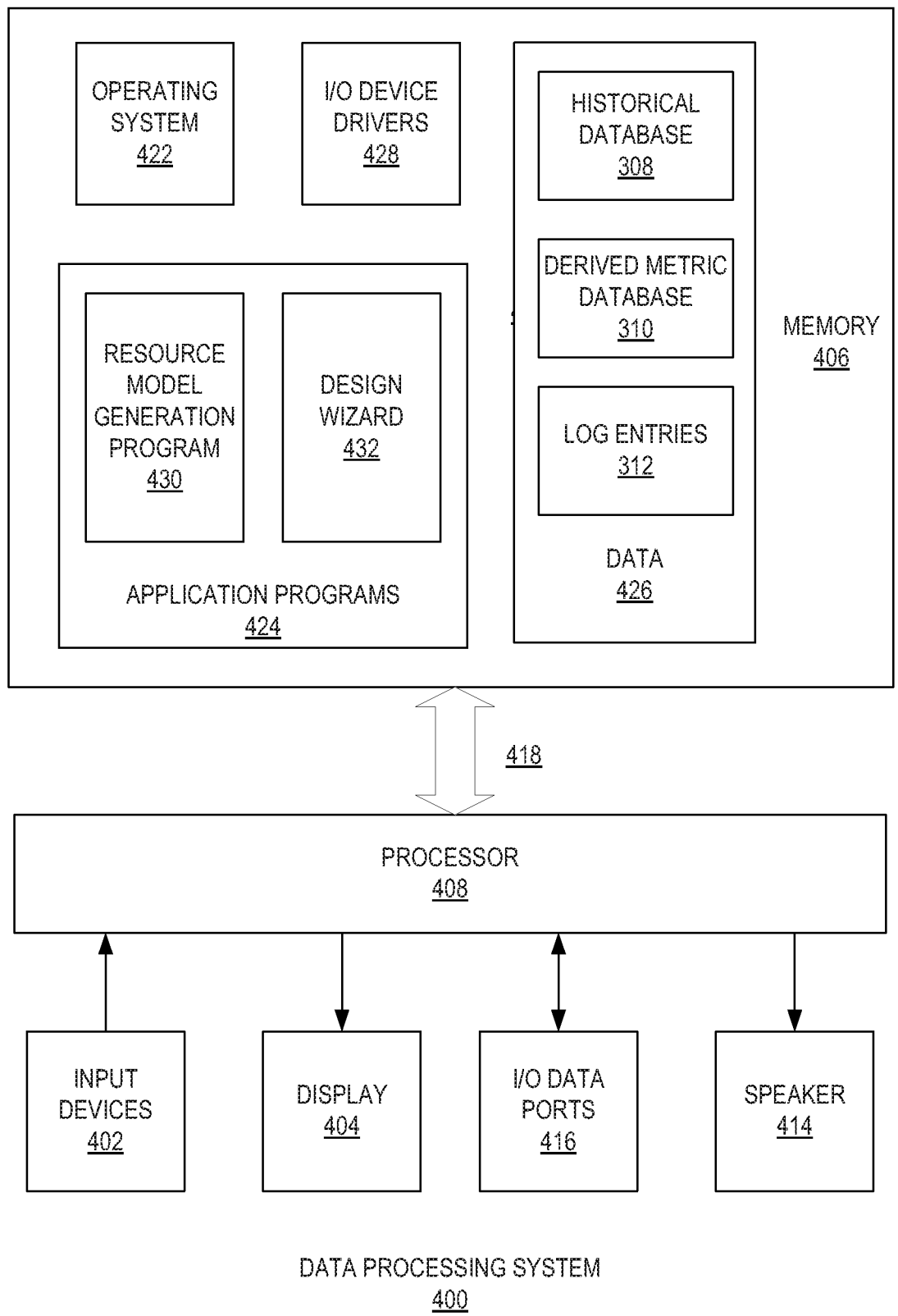
FIG. 4 is a block diagram illustrating data processing systems, methods and computer program products in accordance with embodiments of the present invention.

FIG. 4 is a block diagram illustrating data processing systems, methods and computer program products 400 in accordance with embodiments of the present invention. The data processing system 400 typically includes input device(s) 402 such as a keyboard or keypad, a display 404, and a memory 406 that communicate with a processor 408 via an address/data bus 418. The processor 408 can be any commercially available or custom microprocessor. The data processing system 400 may further include a speaker 414, and I/O data ports 416 that also communicate with the processor 408. The I/O data ports 416 can be used to transfer information between the data processing system 400 and another computer system or a network. These components may be conventional components, such as those used in many conventional data processing systems, which may be configured to operate as described herein.

The memory 406 is representative of the overall hierarchy of memory devices containing the software and data used to implement the functionality of the data processing system 400. The memory 406 can include, but is not limited to, the following types of devices: cache, ROM, PROM, EPROM, EEPROM, flash memory, SRAM, and DRAM. As shown in FIG. 4, the memory 406 may include several categories of software and data used in the data processing system 400: an operating system 422; application programs 424; input/output (I/O) device drivers 428; and data 426. As will be appreciated by those of skill in the art, the operating system 422 may be any operating system suitable for use with a data processing system, such as OS/2, AIX, System390 or Z/OS from International Business Machines Corporation, Armonk, N.Y., Windows95, Windows98, Windows2000, WindowsXP, or Windows7 from Microsoft Corporation, Redmond, Wash., Unix or Linux. The I/O device drivers 428 typically include software routines accessed through the operating system 422 by the application programs 424 to communicate with devices such as the I/O data port(s) 416 and certain memory 406 components. The application programs 424 are illustrative of the programs that implement the various features of the data processing system 400 and preferably include at least one application which supports operations according to embodiments of the present invention. Finally, the data 426 represents the static and dynamic data used by the application programs 424, the operating system 422, the I/O device drivers 428, and other software programs that may reside in the memory 406.

As is further seen in FIG. 4, the application programs 424 may include a resource model generation program 430 and a design wizard 432. The resource model generation program 430 may be a custom application that performs the operations described herein for generating a resource monitoring system. The design wizard 432, if included, may provide an interface that facilitates obtaining information from a designer and/or user that is used in generating and evaluating candidate resource monitoring systems. The design wizard 432 may also be implemented as part of the resource model generation program 430 or may be omitted altogether.

The data portion 426 of memory 406, as shown in the embodiments of FIG. 4, may include a historical database of raw metric data 308. The data portion 426 of memory 406 may further include a database of derived metric values 310, and may also include log entries 312. The data portion 426 of memory 406 may further include various other data sets (not shown in FIG. 4), such as a table recording the number of alerts that would be generated for all of the feasible combinations of occurrences and holes with respect to a candidate resource monitoring system and/or a table identifying the false positive and false negative percentages associated with each such possible (occ, holes) combination.

While the resource model generation program 430 and the components of the data portion 426 of memory 406 are illustrated in FIG. 4 as being part of a single data processing system 400, as will be appreciated by those of skill in the art, the illustrated functionality and data may be distributed across one or more data processing systems. For example, the functionality of the resource model generation program 430 may be provided on one or more data processing systems that are separate from the data processing system that includes the data 426. It will also be appreciated that various applications could be incorporated into the operating system 422 or some other logical division of the data processing system 400. Thus, the present invention should not be construed as limited to the configuration of FIG. 4, but is intended to encompass any arrangement, division of functions between data processing systems and/or configuration capable of carrying out the operations described herein.

Figure 5:
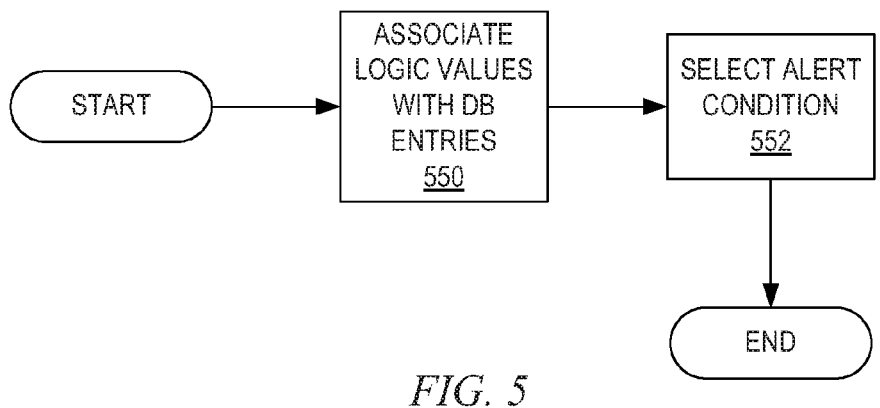
FIG. 5 illustrates operations for selecting an alert condition for a resource monitoring system pursuant to additional embodiments of the present invention.

FIG. 5 illustrates operations for selecting an alert condition for a resource monitoring system pursuant to additional embodiments of the present invention. As shown in FIG. 5, operations start by associating a logic value with at least some of a group of entries in a database (block 550). The entries in the database correspond to values for a plurality of metrics. As discussed above, this database may comprise values for raw metrics and/or derived metrics as a function of time. An existing database may be used, or the database may be independently created. Next, the alert condition may be selected based on at least some of the logic values and at least some of the entries in the database (block 552). In some illustrative embodiments of the present invention, the operations of block 552 may comprise using the logic values and the entries in the database to determine, for at least some of the metrics, a feasible range of values for a threshold such that the threshold will have a specified relationship with respect to the metric, and then selecting the alert condition based on the determined feasible ranges of values.

Figure 6:
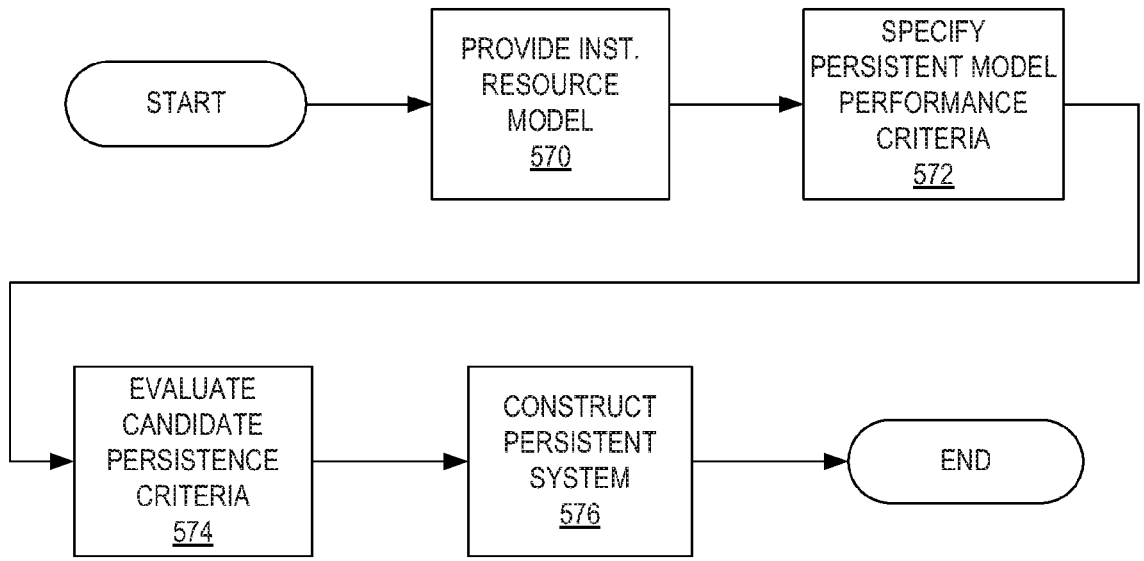
FIG. 6 illustrates operations for generating persistent resource monitoring systems according to embodiments of the present invention.

FIG. 6 illustrates operations for generating persistent resource monitoring systems according to embodiments of the present invention. Operations start with the provision of an instantaneous resource monitoring system that has an associated alert condition (block 670). This instantaneous resource monitoring system may, for example, be a pre-existing resource monitoring system or a system that was developed as described herein. Operations continue in FIG. 6 with the specification of (1) an allowable rate of false positives and (2) an allowable rate of false negatives for the resource monitoring system (block 672). These allowable rates need not necessarily be absolute rates, but instead may represent "expected" maximum rates for false positives and false negative under normal operating conditions. Candidate persistence criteria may then be evaluated (block 674). This may be done, for example, by processing a database of historical information to estimate the number of times that the instantaneous resource monitoring system would take corrective action if applied for a plurality of different persistence criteria (i.e., different combinations of occurrences and holes) (block 674). Finally, one of the plurality of persistence criteria may be selected as the persistence requirement that is applied to the instantaneous resource monitoring system to create the persistent resource monitoring system (block 676). This may be done, for example, by selecting a persistence criteria that achieves the specified false positive and false negative criteria (and, optionally, any responsiveness criteria). If multiple persistence criteria meet the false positive and false negative criteria, the persistence criteria that meets the false positive and false negative criteria and has the smallest time interval may be selected.

The following example illustrates how a persistent resource monitoring system may be developed according to certain illustrative embodiments of the present invention. It will be appreciated, however, that this example is for illustrative purposes only, and is not intended to limit the invention in any way. Also note that the metric values presented in the example are arbitrary, having been randomly chosen for illustrative purposes only, and that the various tables have been simplified to facilitate explanation of this particular example.

First, a particular corrective action may be selected that the resource monitoring system is to implement. The selected corrective action might be, for example, alerting a system operator. Next, a plurality of raw metrics $m_1(t)$, $m_2(t)$, ... $m_n(t)$ are selected that will be monitored by the resource monitoring system. Typically, raw metrics will be selected that are believed to be good indicators of the situations which the resource monitoring system is attempting to detect. The raw metrics selected may, but need not, vary with respect to the particular corrective action selected. Typically, information is available in a historical database as to the values of at least some of the selected raw metrics during previous operation of the resource. An exemplary historical database containing such information is depicted in Table 3.

TABLE 3

| Time | $m_1(t)$ | $m_2(t)$ | ... | $m_n(t)$ | Time Value |
|---|---|---|---|---|---|
| t1 | 4 | 0 | ... | 10 | 112 |
| t2 | 8 | 2 | ... | 18 | 114 |
| t3 | 10 | 93 | ... | 26 | 116 |
| t4 | 12 | 46 | ... | 30 | 118 |
| t5 | 18 | 21 | ... | 33 | 120 |
| t6 | 19 | 36 | ... | 10 | 122 |
| t7 | 24 | 62 | ... | 18 | 124 |
| t8 | 25 | 103 | ... | 26 | 126 |
| t9 | 32 | 20 | ... | 30 | 128 |
| t10 | 35 | 21 | ... | 33 | 130 |

Next several derived metrics $D_1$, $D_2$, $D_3$ are selected that will be used by the resource monitoring system. The selected derived metrics are as follows:

$$D_1(m_i) = m_i(t); \tag{12}$$

$$D_2(m_i) = m_i(t) - m_i(t'); \tag{13}$$

$$D_3(m_i) = [m_i(t) - m_i(t')]/dt. \tag{14}$$

Next, the raw metrics from the historical database (Table 3) and the formulas for the derived metric above are used to construct a second table that converts the historical database of raw metric values into a database of derived metric values. The resulting database is depicted in Table 4.

TABLE 4

| Time | $D_1(m_1)$ | $D_2(m_1)$ | $D_3(m_1)$ | $D_1(m_2)$ | $D_2(m_2)$ | $D_3(m_2)$ | ... | $D_3(m_n)$ |
|---|---|---|---|---|---|---|---|---|
| t1 | 4 | — | — | 0 | — | — | ... | — |
| t2 | 8 | 4 | 2 | 2 | 2 | 1 | ... | 4 |
| t3 | 10 | 2 | 1 | 93 | 91 | 45.5 | ... | 4 |
| t4 | 12 | 2 | 1 | 46 | −47 | −23.5 | ... | 2 |
| t5 | 18 | 6 | 3 | 21 | −25 | −12.5 | ... | 1.5 |
| t6 | 19 | 1 | 0.5 | 36 | 15 | 7.5 | ... | −11.5 |
| t7 | 24 | 5 | 2.5 | 62 | 26 | 13 | ... | 4 |
| t8 | 25 | 1 | 0.5 | 103 | 41 | 20.5 | ... | 4 |
| t9 | 32 | 7 | 3.5 | 20 | −83 | −42.5 | ... | 2 |
| t10 | 35 | 3 | 1.5 | 21 | 1 | 0.5 | ... | 1.5 |

Next, a logic value is associated with each of the entries in the database of derived metric values. As discussed above, the logic values may be chosen, for example, based on historical log entries that correspond to a specific problem that arose where the selected corrective action was found to have been effective in the past. As the log entries have time stamps, the log entries may be associated with specific entries in the derived metric database of Table 4 so that specific logic values can be associated with entries in the database. Table 5 illustrates exemplary logic values that might be associated with the entries in the derived metric database. As shown in Table 5, in this example all of the entries in the database for a given time value are associated with the same logic value (which simplifies the example).

TABLE 5

| Time | $D_1$ ($m_1$) | $D_2$ ($m_1$) | $D_3$ ($m_1$) | $D_1$ ($m_2$) | $D_2$ ($m_2$) | $D_3$ ($m_2$) | ... | $D_3$ ($m_n$) | Logic Value |
|---|---|---|---|---|---|---|---|---|---|
| t1 | 4 | — | — | 0 | — | — | ... | — | No Comm |
| t2 | 8 | 4 | 2 | 2 | 2 | 1 | ... | 4 | No Comm |
| t3 | 10 | 2 | 1 | 93 | 91 | 45.5 | ... | 4 | False |
| t4 | 12 | 2 | 1 | 46 | −47 | −23.5 | ... | 2 | No Comm |
| t5 | 18 | 6 | 3 | 21 | −25 | −12.5 | ... | 1.5 | True |
| t6 | 19 | 1 | 0.5 | 36 | 15 | 7.5 | ... | −11.5 | No Comm |
| t7 | 24 | 5 | 2.5 | 62 | 26 | 13 | ... | 4 | No Comm |
| t8 | 25 | 1 | 0.5 | 103 | 41 | 20.5 | ... | 4 | No Comm |
| t9 | 32 | 7 | 3.5 | 20 | −83 | −42.5 | ... | 2 | No Comm |
| t10 | 35 | 3 | 1.5 | 21 | 1 | 0.5 | ... | 1.5 | No Comm |

Next, the processing steps set forth in Table 1 are used to process each of the entries in the historical database of derived metrics (Table 5) that have an associated logic value of TRUE or FALSE. Starting with the first derived metric, $D_1(m_1)$, Table 5 indicates that at time $t_5$, the predicate $G(D_1(m_1(t)), D_1(m_1(t')), dt)$ is TRUE and that $D_1(m_1)=18$. Likewise, Table 5 indicates that at time $t_3$, $G(D_1(m_1(t)), D_1(m_1(t')), dt)$ is FALSE and $D_1(m_1)=10$. At the remaining times, no commitment is made regarding $G(D_1(m_1(t)), D_1(m_1(t')), dt)$. Table 6 illustrates the processing of this information according to the situational description algorithm set forth in Table 1.

TABLE 6

| Processing Step | A | b | c | d |
|---|---|---|---|---|
| Initialization | 0 | $2^{31}$ | 0 | $2^{31}$ |
| G(x, y, dt) is TRUE when $D_1(m_1) = 18$ | 18 | $2^{31}$ | 0 | 18 |
| G(x, y, dt) is FALSE when $D_1(m_1) = 10$ | 18 | 10 | 10 | 18 |

Thus, for derived metric $D_1(m_1)$, the algorithm of Table 1 produces the following five-tuple:

<Metric, a, b, c, d>=<$D_1(m_1)$, 18, 10, 10, 18>

Since the interval [a, b] contains no members (i.e., there are no numbers that are greater than 18 but less than 10), this portion of the five-tuple is discarded in subsequent processing steps as shown below.

Next, the second derived metric, $D_2(m_1)$, is processed in the same manner as discussed above with respect to derive metric $D_1(m_1)$. Using the database of derived metric values we find that at time $t_5$, $D_2(m_1)=18-12=6$ and that at time $t_3$, $D_2(m_1)=10-8=2$ (these are the only two times for which a logical value of TRUE or FALSE is specified). Table 7 illustrates the processing of the situational description algorithm of Table 1 with respect to derived metric $D_2(m_1)$.

TABLE 7

| Processing Step | A | b | c | d |
|---|---|---|---|---|
| Initialization | 0 | $2^{31}$ | 0 | $2^{31}$ |
| G(x, y, dt) is TRUE when $D_2(m_1) = 6$ | 6 | $2^{31}$ | 0 | 6 |

TABLE 7-continued

| Processing Step | A | b | c | d |
|---|---|---|---|---|
| G(x, y, dt) is FALSE when $D_2(m_1) = 2$ | 6 | 2 | 2 | 6 |

Thus, for derived metric $D_2(m_1)$, the algorithm of Table 1 produces the following five-tuple:

<Metric, a, b, c, d>=<$D_2(m_1)$, 6, 2, 2, 6>

Next, the third derived metric, $D_3(m_1)$, is processed in the same manner. At time $t_5$, $D_3(m_1)=[18-12]/2=3$ and that at time $t_3$, $D_3(m_1)=[10-8]/2=1$ (once again these are the only two times for which a logical value of TRUE or FALSE is specified). Table 8 illustrates the processing of the situational description algorithm of Table 1 with respect to derived metric $D_3(m_1)$.

TABLE 8

| Processing Step | A | b | c | d |
|---|---|---|---|---|
| Initialization | 0 | $2^{31}$ | 0 | $2^{31}$ |
| G(x, y, dt) is TRUE when $D_3(m_1) = 3$ | 3 | $2^{31}$ | 0 | 3 |
| G(x, y, dt) is FALSE when $D_3(m_1) = 1$ | 3 | 1 | 1 | 3 |

Thus, for derived metric $D_3(m_1)$, the algorithm of Table 1 produces the following five-tuple:

<Metric, a, b, c, d>=<$D_3(m_1)$, 3, 1, 1, 3>.

The above process would be repeated for each of the remaining derived metrics $D_1(m_2)$, $D_2(m_2)$, $D_3(m_2)$, $D_1(m_3)$, $D_2(m_3)$, $D_3(m_3)$, ... 3, 1, 1, 3> to generate a five-tuple for each additional derived metric. To simplify this example, the processing for the remaining derived metrics will not be shown and the example will continue under the assumption that the resource monitoring system is developed as a function of only a single raw metric (and hence only the three derived metrics for which five-tuples were generated above).

Next, the algorithm set forth in Equations 8-11 may be executed to generate an instantaneous resource monitoring system. Applying Equations 8-11 to the three five-tuples generated by the processing steps illustrated in Tables 6-8 results in the following candidate instantaneous resource model:

COND=TRUE AND $D_1(m_1) \geq 10$ AND $D_2(m_1) \geq 2$ AND $D_3(m_1) \geq 1$

The designer may, at this point, choose to evaluate this model and possibly modify some of the input assumptions (such as the assigned logical values or the metrics selected) to further refine the model, or may instead choose to first develop the persistent resource monitoring system by performing the operations described below.

To construct the persistent resource monitoring system, the responsiveness, acceptable percentage of false positives and acceptable percentage of false negatives are obtained. Here, we will assume that responsiveness was specified as 11 seconds, the acceptable false positive percentage was specified as 50% and the acceptable false negative percentage was specified as 40%. Since our time samples are 2 seconds apart in this example (see Table 3 above), the responsiveness specification indicates that the results of the instantaneous resource model for at most 5 time samples may be considered before the persistent resource model makes its decision as to whether or not corrective action is required.

Next, the data in the database of derived metric values is used to determine whether or not the condition COND (i.e., the alert condition for the instantaneous resource model) is met at each time sample included in the database. As illustrated in Table 9, the condition COND is met (i.e., there is an "occurrence") at times $t_3$, $t_4$, $t_5$, $t_7$, $t_9$ and $t_{10}$. The condition COND is not met (i.e., there is a "hole") at the remaining four time samples in the historical database of derived metric values.

TABLE 9

| Time | $D_1(m_1)$ | $D_2(m_1)$ | $D_3(m_1)$ | Cond. Met? |
|---|---|---|---|---|
| t1 | 4 | — | — | No |
| t2 | 8 | 4 | 2 | No |
| t3 | 10 | 2 | 1 | Yes |
| t4 | 12 | 2 | 1 | Yes |
| t5 | 18 | 6 | 3 | Yes |
| t6 | 19 | 1 | 0.5 | No |
| t7 | 24 | 5 | 2.5 | Yes |
| t8 | 25 | 1 | 0.5 | No |
| t9 | 32 | 7 | 3.5 | Yes |
| t10 | 35 | 3 | 1.5 | Yes |

The information in Table 9 may then be used to determine the number of alerts that would be delivered by the resource monitoring system for each feasible combination of occurrence and hole settings (occ, hole) or "persistence criteria" if the information from the historical database was fed into the resource monitoring system. This may be accomplished using, for example, the exemplary techniques described above with respect to Table 2. Only the persistence criteria that are feasible given the specified responsiveness criteria need be considered. Here, the terminology (occ, holes) may be defined as (occ+holes) adjacent time samples in the database that includes at least occ number of occurrences. Thus, for example, a persistence criteria of (occ, holes)=(2, 1) is satisfied by three adjacent time samples in the database if at least two of the time samples comprise occurrences. It will be appreciated by those of skill in the art, however, that different definitions for "occurrences" and "holes" may be specified with respect to resource monitoring systems and that the methods, systems and computer program products of the present invention are not limited to any particular definition for occurrences and holes, but may be adapted to be used with any given definition.

A persistence criteria that meets the specified false negative and false positive and any responsiveness criteria may then be selected. The selected persistence criteria may then be used as the wrap-around to the instantaneous resource monitoring system to construct the persistent resource monitoring system.

Thus, with the performance monitoring tool described above, a time series of metrics (including both raw metrics and/or derived metrics) are collected into a database, then logic values of TRUE, FALSE, or NO COMMITMENT are associated with at least some of the values in the database. The user seeds the analysis process with threshold values. The values describe when to post alerts and when not to post alerts using the database values and their associated logic values. This analysis process is part of a "situational description" algorithm that considers instantaneous alert criteria and persistent (based on historical data) alert criteria. This algorithm uses the criteria for the purpose of providing rules that will govern alert presentation. These operations produce a system that can monitor computing system environment metrics and decide on whether an alert needs to be generated and output or not.

In further illustrative embodiments of the present invention, improvements are made to the various operations of the performance monitoring tool previously described. A first improvement is to use a clustering methodology to derive metrics upon which the performance monitoring tool operates. A second improvement is to utilize classification algorithms to create the rules of the "situational description." In a third alternative improvement, a principle components analysis (PCA), feature selection or factor analysis operation, or exploratory analysis, or other parameter reduction algorithm may be performed as part of metric derivation. Such PCA, feature selection or factor analysis operation, or exploratory analysis essentially identifies independent metric data variables that drive one or more dependent metric data variable. It should be appreciated that while these further illustrative embodiments are described herein as improvements to the performance monitoring tool described with reference to FIGS. 3-6, the illustrative embodiments are not limited to such and may in fact be used with any performance monitoring tool that operates on current and/or historical metric data and utilizes or generates performance monitoring rules to determine conditions requiring further action, e.g., automated actions, alert generation, or the like.

Cluster analysis, or "clustering," is a process of assigning data to groups (referred to as "clusters") so that the data in the same cluster is more similar to each other, with regard to one or more attributes of the data, than to data in other clusters. Clustering is a type of statistical data analysis that can be used in pattern recognition. The illustrative embodiments use cluster analysis and a clustering tool with collected metric data, which may be raw historical metric data, raw current metric data, derived historical or current metric data, or a combination of two or more of these types of data, to identify patterns in the collected data. The particular clustering analysis and tool may implement any of a number of different types of clustering algorithms. One example clustering algorithm that may be utilized is the Kohonen-Net clustering algorithm. Other types of clustering algorithms may be used without departing from the spirit and scope of the illustrative embodiments.

With the illustrative embodiments, the clusters are defined according to specific attributes of the metric data, e.g., processor utilization values, memory utilization values, bandwidth utilization, dropped packet frequency, temperature values, power utilization, etc. Thus, a cluster may relate two or more metrics with each other, the same metric on various devices or in various computing environments, or the like, so as to identify patterns within metric data, e.g., processor utilization and memory utilization may be related through clustering, bandwidth utilization and packet drop rates may be related, processor utilization, memory utilization, and temperature may be related through clustering. Any number of metrics may be related with each other to generate clusters. Thus, for example, a first cluster representing high processor utilization and high memory utilization may be identified through the clustering analysis while a second cluster of low processor utilization and high memory utilization may be identified as well. The complexity of the composition of the clusters increases with an increase in the number of metrics (also referred to as parameters or dimensions in this description) combined to define the members of the clusters. Thus, a cluster that is defined in terms of a combination of 10 different metrics is more complex than a cluster defined in terms of a combination of 2 different metrics, for example.

Raw or derived metric data values may be clustered using the clustering analysis and clustering tool to generate groupings of metrics that have similar attributes. Thus, for example, clusters of metric data points for processor utilization may be generated that indicate, for example, processor utilization values over a specified period of time. Thus, if processor utilization is at 80% 10 times during the specified period, a cluster of processor utilization at 80% is generated having 10 data points around that value. Similarly, other processor utilization values may be plotted using clustering for 82% utilization, 85% utilization, etc., and based on the relative similarity or dissimilarity of the processor utilization, clusters may be defined within the raw or derived metric data values. Thus, for example, a simple cluster may be generated that has a basic cluster definition rule of "processor utilization >80%." This cluster definition rule was not known prior to the clustering analysis being performed and thus, is a result of the clustering analysis operation providing insight into the collected metric data. The illustrative embodiments utilize such identified cluster definition rules to define new alert threshold rules or modify existing alert threshold rules, as described hereafter.

Such clustering may be performed with regard to a variety of different metrics for which raw and/or derived metric data values are collected or obtained. For example, the metrics may be processor utilization, memory utilization, bandwidth utilization, dropped packet rates or frequencies, temperature values, power utilization, error notice generation frequency, or any of a plethora of other computing system environment metrics regarding hardware and/or software operation within the computing system environment. The clustering of the various metrics informs the user, performance monitoring tool, or other automated mechanism, of the patterns of metric data that occur relatively more frequently. Thus, for example, if there is a highly populated cluster of processor metric data indicative of processor utilization being greater than 80% and a highly populated cluster of memory utilization metric data indicative of memory utilization less than 20%, then it can be determined that these patterns occur more frequently within the predetermined time frame of the metric data under cluster analysis.

Relationships between clusters may be manually, semi-automatically, or automatically determined based on the clustering analysis. These relationships may be generated via a classification algorithm, for example, that classifies the various clusters according to relative importance and frequency of the clusters, e.g., relative number of members of the clusters, or other parameters/dimensions and corresponding threshold values defining different classes of resource utilization within or between clusters. Such determination of relative importance may be automatically determined based on a mathematical and/or statistical comparison of the clusters. Alternatively, a user may specify which clusters are of importance to the user by the user specifically selecting the clusters after the clustering analysis is performed or by the user specifying the metric data that is of interest to the user, e.g., the user is primarily concerned with processor utilization and memory utilization as opposed to bandwidth utilization, temperature, and power utilization metrics.

Thus, through the clustering analysis and the cluster relationships identification, relationships between performance metrics of a computing system environment that may not have been known or readily discernable from the raw metric data and/or derived metric data may identified. It should be appreciated that while such relationships may be considered trivial with regard to a relatively small number of metrics, in actual practice a large number of different metrics are typically collected by performance monitoring tools, e.g., 50 or more different performance metrics are monitored and performance metric data is collected for these 50 or more performance metrics. Being able to identify patterns of behavior and relationships between large numbers of performance metrics is extremely difficult, time consuming, and not readily apparent to users. Thus, the mechanisms of the illustrative embodiments identify such patterns in collected metric data, determine relationships between such patterns, and further, as described hereafter, provide mechanisms for utilizing these patterns and relationships to define new performance monitoring rules and/or refine existing performance monitoring rules in an automated or semi-automated fashion.

That is, based on the determination of which clusters are of importance to the performance of the monitored computing system environment, performance monitoring rules may be generated based on the cluster definition rules that define the members of the cluster. Thus, in a simple example, assume that the clustering analysis identifies four important clusters of processor utilization and memory utilization metrics within the predetermined time period, e.g., cluster 1 is for processor utilization >80% and memory utilization >80%, cluster 2 is for processor utilization >80% and memory utilization <20%, cluster 3 is for processor utilization <20% and memory utilization >80%, and cluster 4 is for processor utilization <20% and memory utilization <20%. The importance of these clusters, relative to other clusters, may be determined in many different ways but one simple importance measure may be simply the number of members of the cluster. That is, if a cluster has a membership that meets or exceeds a predetermined threshold, then the cluster may be determined to be relatively important with regard to the other clusters that may have a membership less than the predetermined threshold, for example. Other more complex mechanisms for determining relative importance may also be utilized without departing from the spirit and scope of the illustrative embodiments.

For a particular implementation of the illustrative embodiments, extending the example of clusters above, the automated system may automatically, semi-automatically, or via manual input from a user, determine that the four clusters above are of importance to generating alerts by the performance monitoring tool. A rule generation engine may be utilized to take these identified important clusters, determine the underlying cluster definition rules for the clusters, and implement those underlying cluster definition rules as performance monitoring rules or threshold conditions. That is, the cluster definition rules may be used to automatically generate new performance monitoring threshold conditions in one or more performance monitoring rules. Such new rules may replace existing performance monitoring rules or may be used as a basis for searching existing performance monitoring rules, identifying similar existing performance monitoring rules, if any, and modifying them to take into consideration the cluster definition rules of the clusters of importance.

The performance monitoring rules generated in this manner may be deployed in the performance monitoring tool and used as a basis for evaluating future performance metric data generated and collected from the computing system environment. Based on the results of the analysis performed using the performance monitoring tool, a determination of whether the threshold criteria specified in these performance monitoring rules is met or not met may be made. The threshold conditions may specify, for example, one or more values against which metric data may be compared to determine if the metric data represents metric values that are less than, equal to, or greater than the threshold criteria/conditions. For example, as noted above, the threshold criteria or conditions may be of the type processor utilization >80% or memory utilization <20%. The performance monitoring rules may specify one or more of these threshold criteria.

Based on whether or not the threshold criteria or conditions are met or not, the performance monitoring tool may determine whether one or more actions or operations should be performed. Such actions/operations may involve sending alerts, initiating application operations, outputting data, generating log reports, or any of a plethora of other actions/operations. Thus, for example, if a performance monitoring rule specifies the threshold conditions of processor utilization >80% and memory utilization <20%, and the latest collected metric data from the monitored computing system environment indicates that processor utilization is greater than 80% and memory utilization is less than 20%, then an action, such as generating an alert that is sent to a system administrator workstation, initiating an operation to reduce processor utilization such as by offloading processes onto another processor, or the like, may be performed.

Thus, the illustrative embodiments further provide enhanced illustrative embodiments in which clustering and automated or semi-automated performance monitoring threshold criteria/rules are generated. The illustrative embodiments provide improvements over the static and manual based process previously described by allowing the performance monitoring threshold criteria/rules to be adapted to the particular metric data collected from the computing system environment being monitored based on identified relationships of importance in the metric data. The clustering provides the basis for generating the performance monitoring threshold criteria/rules by utilizing the rules defining the clusters as the basis for defining the performance monitoring threshold criteria/rules.

Figure 7:
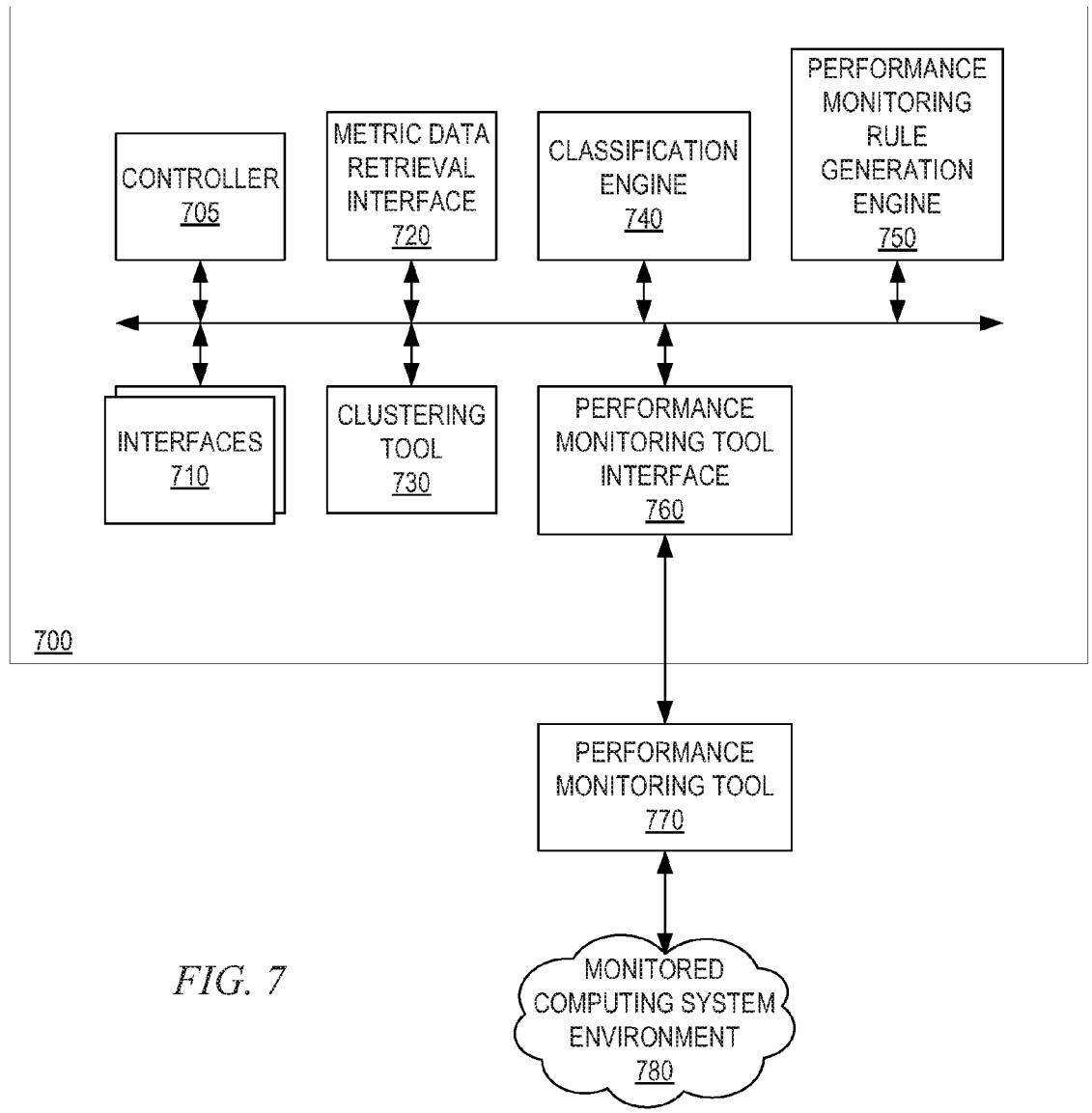
FIG. 7 is a block diagram illustrating the primary operational elements of a performance monitoring tool rule generation engine in accordance with one illustrative embodiment.

FIG. 7 is a block diagram illustrating the primary operational elements of a performance monitoring tool rule generation engine 700 in accordance with one illustrative embodiment. The operational elements shown in FIG. 7 may be implemented in software, hardware, or any combination of software and hardware. In one illustrative embodiment, the operational elements in FIG. 7 may be implemented as software instructions executed by one or more processors, such as processor 408 in FIG. 4, utilizing one or more memories, such as memory 406. Thus, in one illustrative embodiment, the operational elements of FIG. 7 may be implemented as part of the design wizard 432, resource model generation program 430, or as a separate application program 424 that works in conjunction with these other applications programs, for example.

As shown in FIG. 7, the operational elements comprise a controller 705, one or more interfaces 710, a metric data retrieval interface 720, a clustering tool 730, a classification engine 740, a performance monitoring rule generation engine 750, and a performance monitoring tool interface 760. The controller 705 controls the overall operation of the performance monitoring tool rule generation engine 700 and orchestrates the operation of the other elements 710-760. The interfaces 710 provide data communication pathways for communicating data to and from other application programs, such as resource model generation program 430 and design wizard 432, and data storage 326, such as historical database 308, derived metric database 310, and/or log entries 312, for example.

The metric data retrieval interface 720 provide processing logic for retrieve metric data of interest from the data 326, or other metric data storage, and performing pre-processing operations on this metric data so as to facilitate the operation of the clustering, classification, and performance monitoring rule generation of the other elements. This pre-processing may involve, for example, performing principle components analysis (PCA), feature selection, and/or exploratory analysis on the metric data. Moreover, this pre-processing may involve generating derived metric data values based on the raw metric data retrieved from the data storage 326 or other data storage system.

To further illustrate the pre-processing that may be performed, taking PCA as an example, assume that the compute space for the pre-processing is a set of performance, capacity and utilization metrics from an IT solution of the type: $x0, x1, x2 \ldots xj$ that is described by 'n' variables. Thus x can be described in a vector space of n dimensions. Using PCA, x can be transformed to a new set z, that could be described in a vector space of 'm' dimensions where m<n without significant loss of accuracy. Using the new set of observations z on m dimensions, further analysis can be performed without compromising accuracy. Yet, as the dimensions are reduced, this new set can be much more manageable.

To actual perform this dimension reduction using PCA, a generally known methodology may be utilized in which a mean normalization on the data of the compute space is performed followed by scaling, if necessary. A covariance matrix for the data is calculated from which the Eigen values and corresponding Eigen vectors are calculated. The Eigen values are examined to see how many principal components should be considered using screen plots. The original variables and these principal components are then correlated. If this correlation is not clear, the principal components may be rotated for a better match with a desired goal that each of the major principal components should map to one variable each. Having thus arrived at a reduced set of original variables, the illustrative embodiments may then continue on with the clustering operations described herein.

Feature selection is yet another way to reduce dimensionality of the data set by using only a subset of features, i.e. dimensions. Whereas in PCA, all variables are treated equally, with Feature Selection a set of dependant variables is identified and other variables are marked as independent variables with the goal of trying to reduce the set of independent variables. Redundant features duplicate much or all of the information contained in one or more attributes. For example CPU Percentage and CPU time in m-sec would convey the same information. Irrelevant features are another aspect which contain no useful features for the task at hand. For example, Web Sphere Process ID may have no use to model JVM Memory leak. Redundant and irrelevant data can reduce classification accuracy and quality of clusters generated by the clustering mechanisms described herein. Well known Feature selection techniques may be utilized to remove or reduce this redundant and irrelevant data.

In yet another dimensionality reduction mechanism, exploratory data analytics may be utilized. Though initially intended mainly for visual discovery, exploratory data analytics includes descriptive statistics data, preliminary outlier analysis from studying a time series of data, scatter plots, correlation matrix, OLAP etc. It does not include a more involved outlier analysis and pattern analysis which falls under data mining realm using clustering technology. However, it is an important step to obtaining a proper "feel" of the data before one starts heavy duty data mining activities. This may give a very deep insight into the data which may ultimately drive which data mining models to use etc.

It should be appreciated that while any one of these pre-processing mechanisms, or other dimensionality reduction pre-processing mechanisms, may be used, this is not required. The pre-processing operations are optional and may not be necessary, for example, in instances where the dimensionality of the data is not complex enough to warrant dimensionality reduction or in cases where dimensionality reduction is not desirable for other reasons. The clustering tool 730 operates on either the original metric data or the dimensionally reduced metric data set if dimensional reduction operations are performed by a pre-processing of the metric data set. This metric data may be the raw original metric data or derived metric data.

The clustering tool 730 performs the clustering analysis on the metric data, or derived metric data, retrieved and processed by the metric data retrieval interface 720. In performing the clustering, the clustering tool 730 essentially generates cluster definition rules that define the members of the cluster. That is, through the clustering analysis performed on the metric data, clusters based on particular metrics and particular minimum or maximum values associated with these particular metrics may be generated. The definition of these particular metrics and their associated minimum/maximum values for inclusion of data points in the cluster essentially provide a definition of the cluster. This cluster definition was not known prior to the clustering analysis being performed but is generated as a result of the clustering analysis.

The clustering tool 730 generates clusters of metric data/derived metric data for use by the classification engine 740 which classifies the clusters according to importance criteria that is either manually input via a user interface (which may be one of the interfaces 710) in which a user specifically identifies which clusters are to be considered important to the performance monitoring rule generation, semi-automatically determined based on user input specifying general criteria of interest but otherwise automatically identifying clusters of importance based on this general criteria, or fully automatically in which both the importance criteria and the particular clusters of importance are determined through automated mechanisms. Various classification criteria may be specified in the classification engine 740 for determining which clusters to evaluate as important to performance rule generation. These classification criteria may be user defined or automatically generated. For example, a user may specify which metrics are of particular importance to the user when monitoring the performance of a computing system environment. The user may alternatively specify clusters of importance and a commonality of these clusters may be automatically determined by the classification engine 740 and used as a basis for generating a classification criteria. Classification criteria may be automatically generated, for example, based on the most frequent occurrence of particular metrics in the metric data or derived metric data subject to the analysis. Any suitable mechanism for defining the classification criteria may be used without departing from the spirit or scope of the illustrative embodiments.

Based on the classification criteria, the classification engine 740 selects certain ones of the clusters as important clusters to be candidate clusters for generation of performance monitoring rules comprising one or more threshold criteria against which metric data may be compared. Based on the selected candidate clusters, the performance monitoring rule generation engine 750 retrieves, or otherwise determines, the cluster definition rules based on the particular metrics and criteria associated with the metrics for defining the members of the cluster. The performance monitoring rule generation engine 750 then generates a performance monitoring rule based on the cluster definition rules. This may involve a translation of the cluster definition rule into a performance monitoring rule that may be utilized by the particular performance monitoring tool 770, may involve combining a number of cluster definition rules into a single set of one or more performance monitoring rules, or the like. The resulting performance monitoring rule may be stored for later deployment into the performance monitoring tool 770. In some illustrative embodiments, the performance monitoring rule may be output to a user via one of the interfaces 710 so that the user may authorize or reject the implementation of the performance monitoring rule in the performance monitoring tool 770.

The performance monitoring tool interface 760 may be used to interface with a performance monitoring tool 770 that operates to monitor the performance metrics of a monitored computing system environment 790 having a plurality of computing system resources in a manner generally known in the art. The performance tool interface 760, however, provides a data communication pathway through which the performance monitoring tool rule generation engine 700 may provide new or modified performance monitoring rules to be implemented and applied by the performance monitoring tool 770 to the metric data collected by the performance monitoring tool 770 from the monitored computing system environment 790. Thus, the performance monitoring rules generated by the performance monitoring rule generation engine 750 may be output to the performance monitoring tool 770 via the performance monitoring tool interface 760. The performance monitoring tool 770 may then use these performance monitoring rules to determine whether to initiate an action/operation based on the threshold criteria in the performance monitoring rules being satisfied (met) or not by the current metric data collected by the performance monitoring tool 770.

Figure 8:
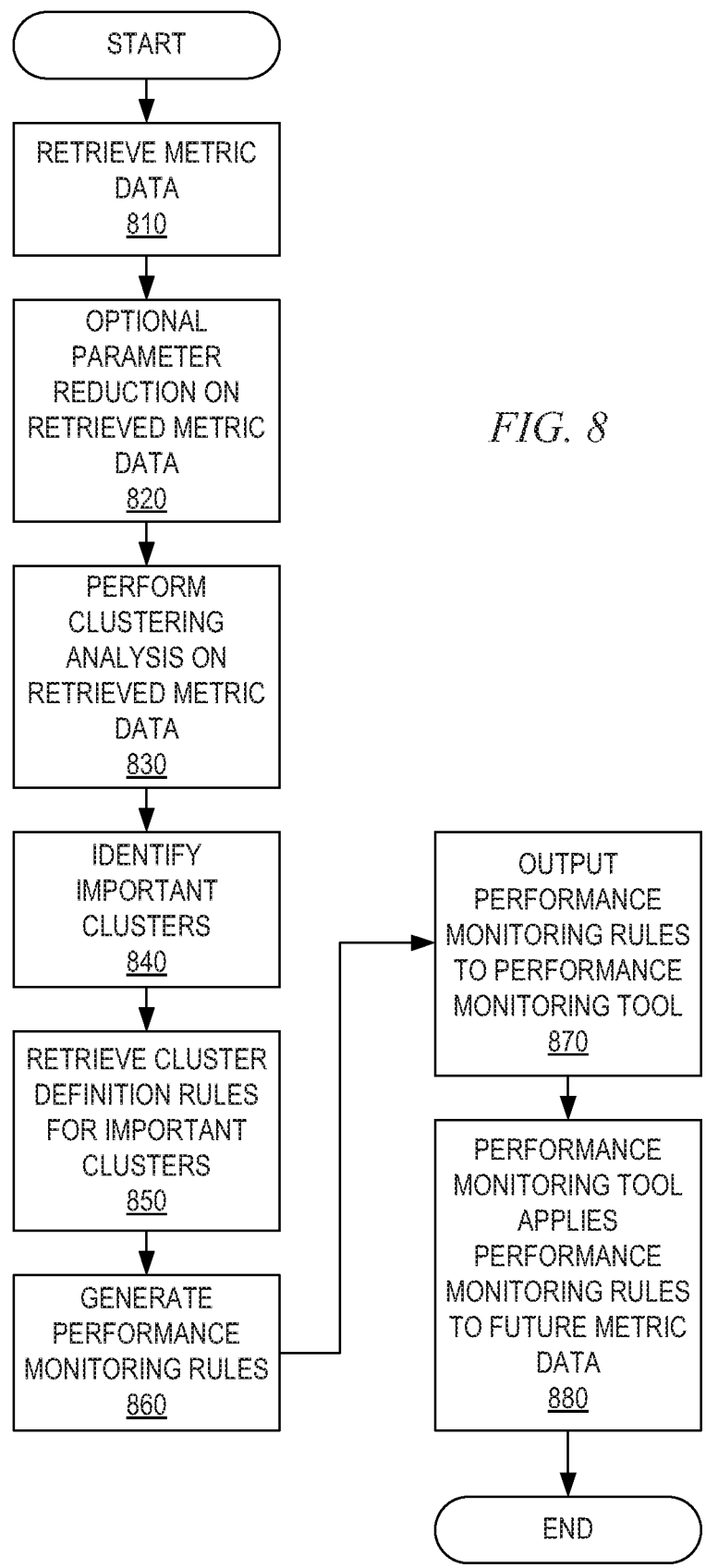
FIG. 8 is a flowchart outlining an example operation for generating performance monitoring rules in accordance with one illustrative embodiment.

FIG. 8 is a flowchart outlining an example operation for generating performance monitoring rules in accordance with one illustrative embodiment. The operation outlined in FIG. 8 may be implemented, for example, by the performance monitoring rule generation engine 700 in FIG. 7, for example. The operation outlined in FIG. 8, and performed by the performance monitoring rule generation engine 700, may be initiated any desirable way either through manual intervention, e.g., a user command, or through automated mechanisms, e.g., a predefined schedule, the occurrence of an event in a monitored computing system environment, e.g., an error condition occurring, a number of errors occurring equaling or exceeding a predetermined threshold, or the like.

As shown in FIG. 8, the operation starts with retrieving historical and/or current raw/derived metric data collected from a monitored computing system environment, hereafter referred to as the "retrieve metric data" (step 810). An optional parameter reduction operation is performed on the retrieved metric data to identify the key independent metrics that drive dependent metrics in the retrieved metric data (step 820). This parameter reduction, or dimension reduction as referred to previously, operation may comprise a PCA, Feature Selection, Exploratory Data Analytics, or other parameter/dimension reduction operation to reduce the numbers of parameters/dimensions considered when performing the clustering later performed.

Thereafter, or if no parameter reduction operation is performed, then clustering analysis is performed on the retrieved metric data (or the reduced metric data if a parameter reduction operation is performed) to generate clusters of metric data (step 830). Clusters of importance are identified from the plurality of clusters generated by the clustering analysis based on importance criteria (step 840). The clustering analysis provides information regarding the composition of each of the clusters, i.e. the dimensions or parameters that define the clusters. If a cluster is composed of 2 dimensions, such as memory and processor utilization, then the determination of the cluster composition is relatively more simple to determine. However, if the cluster is composed of n dimensions or parameters, it becomes significantly more difficult to identify the composition of the clusters and the basis for cluster separation. This certainly cannot be done in a manual manner. This is made even more difficult if parameter/dimension reduction is not performed as a pre-processing operation, e.g., in step 820.

Thus, as noted above, in cases where the dimensionality or number of parameters is relatively large, as may be determined based on a predetermined threshold number of dimensions/parameters, a dimensionality/parameter reduction operation (step 820) is performed to reduce the number of dimensions that are input to the clustering analysis (step 830). As noted above, this is optional for cases where there are relatively few parameters/dimensions.

The cluster definition rules for the clusters of importance are determined (step 850). This may involve a classification operation as previously discussed above to retrieve rules that determine cluster composition. For example, cluster 1 may be for CPU>45% and Memory>20% and <45% and input/output (I/O) rate<15% (or this could be expressed in terms of probabilities in other cases, or any other mathematical or statistical measure). This classification of important clusters is essentially a mathematic extraction of a visual pattern (clusters).

Performance monitoring rules are then generated based on the cluster definition rules of the identified clusters of importance (step 860). The performance monitoring rules are then output to a performance monitoring tool (step 870) which then applies the performance monitoring rules to future collected metric data to determine if an action/operation is to be initiated based on whether the threshold criteria specified in the performance monitoring rules is met or not met (satisfied or not satisfied) (step 880). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining threshold conditions for performing operations within a performance monitoring tool, comprising:

collecting, by the data processing system, performance metric data of resource utilization for a plurality of performance metrics from hardware and software resources of a computing system environment;

retrieving, by the data processing system, the collected performance metric data in response to a number of errors exceeding a predetermined threshold;

performing, by the data processing system, clustering analysis on the retrieved performance metric data to generate a plurality of clusters of the retrieved performance metric data, wherein the performing the clustering analysis comprises performing a principle components analysis (PCA) on the retrieved performance metric data to reduce a number of parameters within the retrieved performance metric data;

selecting, by the data processing system, a plurality of candidate clusters in the plurality of clusters that are candidate clusters for dynamically generating threshold conditions for performance monitoring, wherein selecting the plurality of candidate clusters further comprises classifying each cluster in the plurality of clusters into a classification according to a plurality of cluster definition rules that are fully automatically defined based on analysis of the retrieved performance metric data;

determining, by the data processing system, the plurality of cluster definition rules associated with the selected plurality of candidate clusters, the plurality of cluster definition rules being rules defining metric data values that cause each member of the selected plurality of candidate clusters to be in the respective cluster, wherein the plurality of cluster definition rules are not known prior to the clustering analysis being performed and thus, is a result of the clustering analysis operation;

generating, by the data processing system, the threshold conditions for performance monitoring based on the plurality of cluster definition rules that define the members of each of the selected plurality of candidate clusters, wherein the generating of the threshold conditions further comprises searching existing threshold conditions for similar threshold conditions to the generated threshold conditions and modifying the similar threshold conditions based on the generated threshold conditions; and applying, by the data processing system, the threshold conditions to future performance metric data to determine whether to perform an operation in response to the future performance metric data meeting or not meeting at least one threshold condition, wherein the operation is initiating an operation to reduce processor utilization by offloading processes onto another processor, generating a log report, and output an alert message.

2. The method of claim 1, wherein the generating of the at least one threshold condition comprises combining, by the data processing system, conditions of the plurality of cluster definition rules to specify a relationship between the conditions that defines the at least one threshold condition.

3. The method of claim 1, wherein the operation is an operation to post the alert message.

4. The method of claim 1, wherein the operation is outputting data.

5. The method of claim 1, wherein the performance metric data is derived performance metric data that is derived from a plurality of time series raw historical performance metric data and raw performance metric data obtained from the hardware and software resources of the computing system environment; and further comprising:
  initiating, by the data processing system, a performance monitoring rule generation engine in response to the number of errors exceeding the predetermined threshold in the computing system environment.

6. The method of claim 1, wherein the performing the clustering analysis on the retrieved performance metric data further comprises:
  performing, by the data processing system, a parameter reduction operation on the retrieved performance metric data to reduce a number of parameters within the retrieved performance metric data on which the clustering analysis is performed.

7. The method of claim 6, wherein the parameter reduction operation comprises at least one of a feature selection or factor analysis operation, or exploratory analysis.

8. The method of claim 1, wherein the selecting of the plurality of candidate clusters in the plurality of clusters that are candidate clusters for generating the threshold conditions for the performance monitoring comprises classifying, by the data processing system, each cluster in the plurality of clusters into the classification according to the plurality of cluster definition rules.

9. The method of claim 8, wherein the plurality of cluster definition rules are at least one of:
  manually defined by a user specifically identifying which clusters in the plurality of clusters are to be selected via a user interface,
  semi-automatically defined based on user input specifying general cluster definition rules but otherwise automatically selecting the plurality of candidate clusters based on the general cluster definition rules, or
  fully automatically defined by an automated mechanism automatically defining the plurality of cluster definition rules based on analysis of the retrieved performance metric data.

10. The method of claim 1, wherein the cluster definition rules are not known prior to the clustering analysis being performed and thus, is a result of the clustering analysis operation providing insight into the collected performance metric data.

11. A computer program product comprising a non-transitory computer readable storage medium having a computer readable program stored therein, wherein the computer readable program, when executed on a computing device, causes the computing device to:

collect performance metric data of resource utilization for a plurality of performance metrics from hardware and software resources of a computing system environment;

retrieve the collected performance metric data in response to a number of errors exceeding a predetermined threshold;

perform clustering analysis on the retrieved performance metric data to generate a plurality of clusters of the retrieved performance metric data, wherein the computer readable program to perform the clustering analysis further causes the computing device to perform a principle components analysis (PCA) on the retrieved performance metric data to reduce a number of parameters within the retrieved performance metric data;

select a plurality of candidate clusters in the plurality of clusters that are candidate clusters for dynamically generating threshold conditions for performance monitoring, wherein the computer readable program to select the plurality of candidate clusters further causes the computing device to classify each cluster in the plurality of clusters into a classification according to a plurality of cluster definition rules that are fully automatically defined based on analysis of the retrieved performance metric data;

determine the plurality of cluster definition rules associated with the selected plurality of candidate clusters, the plurality of cluster definition rules being rules defining metric data values that cause each member of the selected plurality of candidate clusters to be in the respective cluster, wherein the plurality of cluster definition rules are not known prior to the clustering analysis being performed and thus, is a result of the clustering analysis operation;

generate the threshold conditions for performance monitoring based on the plurality of cluster definition rules that define the members of each of the selected plurality of candidate clusters, wherein the computer readable program to generate the threshold conditions further causes the computing device to search existing threshold conditions for similar threshold conditions to the generated threshold conditions and modify the similar threshold conditions based on the generated threshold conditions; and apply the threshold conditions to future performance metric data to determine whether to perform an operation in response to the future performance metric data meeting or not meeting at least one threshold conditions, wherein the operation is initiating an operation to reduce processor utilization by offloading processes onto another processor, generating a log report, and output an alert message.

12. The computer program product of claim 11, wherein the computer readable program to generate the at least one threshold condition further causes the computing device to combine conditions of the plurality of cluster definition rules to specify a relationship between the conditions that defines the at least one threshold condition.

13. The computer program product of claim 11, wherein the operation is an operation to post the alert message.

14. The computer program product of claim 11, wherein the operation is outputting data.

15. The computer program product of claim 11, wherein the performance metric data is derived performance metric data that is derived from a plurality of time series raw historical performance metric data and raw performance metric data obtained from the hardware and software resources of the computing system environment; and wherein the computer readable program further causes the computing device to initiate a performance monitoring rule generation engine in response to the number of errors exceeding the predetermined threshold in the computing system environment.

16. The computer program product of claim 11, wherein the computer readable program further causes the computing device to perform the clustering analysis on the retrieved performance metric data by:

performing a parameter reduction operation on the retrieved performance metric data to reduce a number of parameters within the retrieved performance metric data on which the clustering analysis is performed.

17. The computer program product of claim 16, wherein the parameter reduction operation comprises at least one of a feature selection or factor analysis operation, or exploratory analysis.

18. The computer program product of claim 11, wherein the computer readable program further causes the computing device to select the plurality of candidate clusters in the plurality of clusters that are candidate clusters for generating the threshold conditions for the performance monitoring by classifying each cluster in the plurality of clusters into the classification according to the one or more cluster definition rules.

19. The computer program product of claim 18, wherein the plurality of cluster definition rules are at least one of:

manually defined by a user specifically identifying which clusters in the plurality of clusters are to be selected via a user interface, semi-automatically defined based on user input specifying general cluster definition rules but otherwise automatically selecting the one or more candidate clusters based on the general cluster definition rules, or fully automatically defined by an automated mechanism automatically defining the one or more cluster definition rules based on analysis of the retrieved performance metric data.

20. An apparatus, comprising:

a processor; and a memory coupled to the processor, wherein the memory comprises instructions which, when executed by the processor, cause the processor to:

collect performance metric data of resource utilization for a plurality of performance metrics from hardware and software resources of a computing system environment;

retrieve the collected performance metric data in response to a number of errors exceeding a predetermined threshold;

perform clustering analysis on the retrieved performance metric data to generate a plurality of clusters of the retrieved performance metric data, wherein the computer readable program to perform the clustering analysis further causes the computing device to perform a principle components analysis (PCA) on the retrieved performance metric data to reduce a number of parameters within the retrieved performance metric data;

select a plurality of candidate clusters in the plurality of clusters that are candidate clusters for dynamically generating threshold conditions for performance monitoring, wherein the computer readable program to select the plurality of candidate clusters further causes the computing device to classify each cluster in the plurality of clusters into a classification according to a plurality of cluster definition rules that are fully automatically defined based on analysis of the retrieved performance metric data;

determine the plurality of cluster definition rules associated with the selected plurality of candidate clusters, the plurality of cluster definition rules being rules defining metric data values that cause each member of the selected plurality of candidate clusters to be in the respective cluster, wherein the plurality of cluster definition rules are not known prior to the clustering analysis being performed and thus, is a result of the clustering analysis operation;

generate the threshold conditions for performance monitoring based on the plurality of cluster definition rules that define the members of each of the selected plurality of candidate clusters, wherein the computer readable program to generate the threshold conditions further causes the computing device to search existing threshold conditions for similar threshold conditions to the generated threshold conditions and modify the similar threshold conditions based on the generated threshold conditions; and apply the threshold conditions to future performance metric data to determine whether to perform an operation in response to the future performance metric data meeting or not meeting at least one threshold conditions, wherein the operation is initiating an operation to reduce processor utilization by offloading processes onto another processor, generating a log report, and output an alert message.

21. The apparatus of claim 20, wherein the instructions further cause the processor to perform the clustering analysis on the retrieved performance metric data by:

performing a parameter reduction operation on the retrieved performance metric data to reduce a number of parameters within the retrieved performance metric data on which the clustering analysis is performed.

\* \* \* \* \*